(12) United States Patent
Ramaswamy et al.

(10) Patent No.: US 8,600,216 B2
(45) Date of Patent: Dec. 3, 2013

(54) DATA INSERTION APPARATUS AND METHODS FOR USE WITH COMPRESSED AUDIO/VIDEO DATA

(75) Inventors: Arun Ramaswamy, Tampa, FL (US); Venugopal Srinivasan, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 472 days.

(21) Appl. No.: 12/942,800

(22) Filed: Nov. 9, 2010

(65) Prior Publication Data

US 2011/0055860 A1    Mar. 3, 2011

Related U.S. Application Data

(63) Continuation of application No. 11/535,269, filed on Sep. 26, 2006, now Pat. No. 7,853,124, which is a continuation of application No. PCT/US2005/011630, filed on Apr. 7, 2005.

(60) Provisional application No. 60/560,150, filed on Apr. 7, 2004.

(51) Int. Cl.
*H04N 9/82* (2006.01)

(52) U.S. Cl.
USPC .............................. 386/246; 725/14; 725/32

(58) Field of Classification Search
USPC ...................................... 386/246; 725/14, 32
See application file for complete search history.

(56) References Cited

U.S. PATENT DOCUMENTS

| 4,367,488 A | 1/1983 | Leventer et al. |
|---|---|---|
| 4,939,515 A | 7/1990 | Adelson |
| 4,963,998 A | 10/1990 | Maufe |

(Continued)

FOREIGN PATENT DOCUMENTS

| AU | 2004201423 | 4/2004 |
|---|---|---|
| EP | 0986047 | 3/2000 |

(Continued)

OTHER PUBLICATIONS

International Searching Authority, "International Search Report and Written Opinion," issued in connection with PCT Application No. PCT/US05/11630, on Jan. 27, 2012 (8 pages).

(Continued)

*Primary Examiner* — Gelek W Topgyal
*Assistant Examiner* — Girumsew Wendmagegn
(74) *Attorney, Agent, or Firm* — Hanley, Flight & Zimmerman, LLC

(57) ABSTRACT

Methods, apparatus, and articles of manufacture for performing data insertion in compressed audio/video data streams are disclosed. An example method disclosed herein to insert audience measurement data in a compressed media data stream comprises rearranging data in frames of the compressed media data stream to form contiguous sequences of skip bytes at respective locations in the frames of the compressed media data stream, the audience measurement data to be inserted in the compressed media data stream at the locations of the contiguous sequences of skip bytes, the contiguous sequences of skip bytes having respective lengths, and inserting different types of audience measurement data at the locations of the contiguous sequences of skip bytes in two different frames of the compressed media data stream based on the respective lengths of the contiguous sequences of skip bytes in the two different frames of the compressed media data stream.

18 Claims, 17 Drawing Sheets

(56) References Cited

U.S. PATENT DOCUMENTS

| | | |
|---|---|---|
| 4,969,041 A | 11/1990 | O'Grady et al. |
| 5,019,899 A | 5/1991 | Boles et al. |
| 5,079,648 A | 1/1992 | Maufe |
| 5,319,453 A | 6/1994 | Copriviza et al. |
| 5,432,558 A | 7/1995 | Kim |
| 5,450,490 A | 9/1995 | Jensen et al. |
| 5,455,630 A | 10/1995 | McFarland et al. |
| 5,463,423 A | 10/1995 | Tults |
| 5,481,294 A | 1/1996 | Thomas et al. |
| 5,512,933 A | 4/1996 | Wheatley et al. |
| 5,532,732 A | 7/1996 | Yuen et al. |
| 5,612,943 A | 3/1997 | Moses et al. |
| 5,629,739 A | 5/1997 | Dougherty |
| 5,650,825 A * | 7/1997 | Naimpally et al. ............ 348/465 |
| 5,652,615 A | 7/1997 | Bryant et al. |
| 5,682,463 A | 10/1997 | Allen et al. |
| 5,719,634 A | 2/1998 | Keery et al. |
| 5,737,026 A | 4/1998 | Lu et al. |
| 5,764,763 A | 6/1998 | Jensen et al. |
| 5,768,426 A | 6/1998 | Rhoads |
| 5,774,452 A | 6/1998 | Wolosewicz |
| 5,822,360 A | 10/1998 | Lee et al. |
| 5,825,976 A | 10/1998 | Dorward et al. |
| 5,848,155 A | 12/1998 | Cox |
| 5,850,249 A | 12/1998 | Massetti et al. |
| 5,915,027 A | 6/1999 | Cox et al. |
| 5,930,369 A | 7/1999 | Cox et al. |
| 5,940,135 A | 8/1999 | Petrovic et al. |
| 5,966,120 A | 10/1999 | Arazi et al. |
| 5,974,299 A | 10/1999 | Massetti |
| 6,061,793 A | 5/2000 | Tewfik et al. |
| 6,064,748 A | 5/2000 | Hogan |
| 6,069,914 A | 5/2000 | Cox |
| 6,081,783 A | 6/2000 | Divine et al. |
| 6,128,736 A | 10/2000 | Miller |
| 6,154,484 A | 11/2000 | Lee et al. |
| 6,154,571 A | 11/2000 | Cox et al. |
| 6,175,639 B1 | 1/2001 | Satoh et al. |
| 6,192,427 B1 | 2/2001 | Li et al. |
| 6,208,735 B1 | 3/2001 | Cox et al. |
| 6,215,526 B1 | 4/2001 | Barton et al. |
| 6,219,634 B1 | 4/2001 | Levine |
| 6,229,924 B1 | 5/2001 | Rhoads et al. |
| 6,243,481 B1 | 6/2001 | Tao |
| 6,252,631 B1 | 6/2001 | Lakhani |
| 6,259,801 B1 | 7/2001 | Wakasu |
| 6,263,087 B1 | 7/2001 | Miller |
| 6,266,096 B1 | 7/2001 | Gutsmann et al. |
| 6,268,866 B1 | 7/2001 | Shibata |
| 6,272,176 B1 | 8/2001 | Srinivasan |
| 6,278,792 B1 | 8/2001 | Cox et al. |
| 6,289,514 B1 | 9/2001 | Link et al. |
| 6,298,142 B1 | 10/2001 | Nakano et al. |
| 6,307,950 B1 | 10/2001 | Powell et al. |
| 6,332,194 B1 | 12/2001 | Bloom et al. |
| 6,338,037 B1 | 1/2002 | Todd et al. |
| 6,353,929 B1 | 3/2002 | Houston |
| 6,359,573 B1 | 3/2002 | Taruguchi et al. |
| 6,373,960 B1 | 4/2002 | Conover et al. |
| 6,400,827 B1 | 6/2002 | Rhoads |
| 6,415,041 B1 | 7/2002 | Oami et al. |
| 6,421,445 B1 | 7/2002 | Jensen et al. |
| 6,421,450 B2 | 7/2002 | Nakano |
| 6,438,252 B2 | 8/2002 | Miller |
| 6,453,053 B1 | 9/2002 | Wakasu |
| 6,456,724 B1 | 9/2002 | Watanabe |
| 6,467,089 B1 | 10/2002 | Aust et al. |
| 6,470,090 B2 | 10/2002 | Oami et al. |
| 6,477,707 B1 | 11/2002 | King et al. |
| 6,493,457 B1 | 12/2002 | Quackenbush et al. |
| 6,505,223 B1 | 1/2003 | Haitsma et al. |
| 6,507,299 B1 | 1/2003 | Nuijten |
| 6,510,233 B1 | 1/2003 | Nakano |
| 6,512,796 B1 | 1/2003 | Sherwood |
| 6,513,161 B2 | 1/2003 | Wheeler et al. |
| 6,519,769 B1 | 2/2003 | Hopple et al. |
| 6,523,175 B1 | 2/2003 | Chan |
| 6,530,082 B1 | 3/2003 | Del Sesto et al. |
| 6,553,070 B2 | 4/2003 | Hashimoto |
| 6,574,350 B1 | 6/2003 | Rhoads et al. |
| 6,584,138 B1 | 6/2003 | Neubauer et al. |
| 6,611,607 B1 | 8/2003 | Davis et al. |
| 6,647,129 B2 | 11/2003 | Rhoads |
| 6,664,976 B2 | 12/2003 | Lofgren et al. |
| 6,665,419 B1 | 12/2003 | Oami |
| 6,668,068 B2 | 12/2003 | Hashimoto |
| 6,678,392 B2 | 1/2004 | Powell et al. |
| 6,697,499 B2 | 2/2004 | Oami |
| 6,700,993 B1 | 3/2004 | Minematsu |
| 6,724,911 B1 | 4/2004 | Cox et al. |
| 6,735,325 B2 | 5/2004 | Wakasu |
| 6,738,493 B1 | 5/2004 | Cox et al. |
| 6,738,744 B2 | 5/2004 | Kirovski et al. |
| 6,785,399 B2 | 8/2004 | Fujihara |
| 6,785,903 B1 * | 8/2004 | Kuh ............................ 725/50 |
| 6,798,893 B1 | 9/2004 | Tanaka |
| 6,807,528 B1 * | 10/2004 | Truman et al. ................ 704/229 |
| 6,826,289 B1 | 11/2004 | Hashimoto |
| 6,834,345 B2 | 12/2004 | Bloom et al. |
| 6,853,737 B2 | 2/2005 | Watanabe |
| 6,856,693 B2 | 2/2005 | Miller |
| 6,915,000 B1 | 7/2005 | Tanaka |
| 6,928,165 B1 | 8/2005 | Takai |
| 6,947,562 B2 | 9/2005 | Hashimoto |
| 6,947,572 B2 | 9/2005 | Terasaki |
| 6,968,564 B1 | 11/2005 | Srinivasan |
| 6,996,249 B2 | 2/2006 | Miller et al. |
| 7,007,167 B2 | 2/2006 | Kurahashi |
| 7,027,611 B2 | 4/2006 | Hashimoto |
| 7,050,604 B2 | 5/2006 | Fujihara et al. |
| 7,051,207 B2 | 5/2006 | Watanabe |
| 7,092,546 B2 | 8/2006 | Tanaka |
| 7,114,073 B2 | 9/2006 | Watanabe |
| 7,146,501 B2 | 12/2006 | Tanaka |
| 7,149,324 B2 | 12/2006 | Tanaka |
| 7,159,117 B2 | 1/2007 | Tanaka |
| 7,587,601 B2 | 9/2009 | Levy et al. |
| 7,742,737 B2 | 6/2010 | Peiffer et al. |
| 2001/0026616 A1 | 10/2001 | Tanaka |
| 2001/0031064 A1 | 10/2001 | Donescu et al. |
| 2001/0047478 A1 | 11/2001 | Mase |
| 2001/0053235 A1 | 12/2001 | Sato |
| 2001/0053237 A1 | 12/2001 | Hashimoto |
| 2002/0006203 A1 | 1/2002 | Tachibana |
| 2002/0010919 A1 | 1/2002 | Lu et al. |
| 2002/0059632 A1 | 5/2002 | Link et al. |
| 2002/0085736 A1 | 7/2002 | Kalker et al. |
| 2002/0085737 A1 | 7/2002 | Kitamura |
| 2002/0097891 A1 | 7/2002 | Hinishi |
| 2002/0106106 A1 | 8/2002 | Sato |
| 2002/0129253 A1 | 9/2002 | Langelaar |
| 2002/0138736 A1 | 9/2002 | Morin |
| 2002/0147990 A1 | 10/2002 | Lu et al. |
| 2003/0081781 A1 | 5/2003 | Jensen et al. |
| 2003/0131350 A1 | 7/2003 | Peiffer et al. |
| 2003/0133590 A1 | 7/2003 | Miller et al. |
| 2004/0024588 A1 | 2/2004 | Watson et al. |
| 2004/0059918 A1 | 3/2004 | Xu |
| 2006/0171474 A1 | 8/2006 | Ramaswamy et al. |
| 2007/0040934 A1 | 2/2007 | Ramaswamy et al. |

FOREIGN PATENT DOCUMENTS

| | | |
|---|---|---|
| GB | 2063018 | 5/1981 |
| GB | 2196167 | 4/1988 |
| WO | 99/63443 | 12/1999 |
| WO | 01/61892 | 8/2001 |
| WO | 02/091361 | 11/2002 |
| WO | 2004/038538 | 5/2004 |
| WO | 2005/002200 | 1/2005 |
| WO | 2005/008582 | 1/2005 |

(56) References Cited

FOREIGN PATENT DOCUMENTS

| WO | 2005/099385 | 10/2005 |
|---|---|---|
| WO | 2005099385 | 10/2005 |

OTHER PUBLICATIONS

International Bureau, "International Preliminary Report on Patentability," issued in connection with PCT Application No. PCT/US05/11630, on Mar. 8, 2012 (7 pages).
TIPO, "Preliminary Examination Report," issued in connection with corresponding TW Application No. 094110973, on Feb. 9, 2012 (22 pages).
Canadian Intellectual Property Office, "First Office Action," issued in connection with Canadian Application No. 2,562,137 on Jun. 27, 2011 (4 pages).
Patent Cooperation Treaty, "International Preliminary Examination Report," issued in connection with PCT Application No. PCT/US03/28037, mailed Mar. 15, 2007, completed Feb. 1, 2007, 4 pages.
State Intellectual Property Office of China, "Notice of Completion of Formalities for Patent Registration," issued in connection with Chinese Application No. 03825624.X, issued Aug. 1, 2008, 5 pages.
Mexicano La Propiedad Industrial, "Office action," issued Feb. 5, 2009, in connection with Mexican Patent Application No. PA/a/2005/004231, 2 pages.
United States Patent and Trademark Office, "Office Action," issued in connection with U.S. Appl. No. 11/237,251, mailed Nov. 24, 2009, 12 pages.
United States Patent and Trademark Office, "Restriction Requirement," issued in connection with U.S. Appl. No. 11/237,251, mailed Aug. 6, 2009, 7 pages.
Intellectual Property Corporation of Malaysia. Substantive/Modified Substantive Examination Adverse Report for MY Application No. PI20051568. mailed May 22, 2009, 5 pages.
Advanced Television Systems Committee, "All About PSIP: Roadmap to the DTV Program and System Information Protocol," www.psip.org, Apr. 20, 2003, 4 pages.
Allison, Arthur W., "PSIP 101: What You Need to Know," Broadcast Engineering, Jun. 2001, 3 pages.
CITESEER.IST, "Content-Based Digital Watermarking for Compressed Audio (2000)", 1995-2000, Citeseer.ist.psu.edu, 1 page.
"Digital Audio Watermarking," Audio Media, Jan./Feb. 1998. pp. 56, 57, 59, and 61.
Fraunhofer IIS, "Audio & Multimedia Watermarking", http://.iis.fraunhofer.de/amm/techinf/water/, 1998-2006, 7 pages.
Heredia, Edwin A., "PSIP: The Digital Television Protocol for System Information and Program Guide," Thompson Multimedia, Indianapolis, IN, 7 pages.
Herre, Juergen, "Audio Watermarking in the Bitstream Domain", IEEE, Jun. 12-13, 2000, 23 pages.
Patent Cooperation Treaty, International Search Report for PCT/US2002/03 705, Sep. 11, 2002, 2 pages.
Patent Cooperation Treaty, International Search Report for PCT/US2003/28037, Feb. 28, 2005, 3 pages.
Patent Cooperation Treaty, Written Opinion for PCT/US2003/28037, Oct. 12, 2006, 4 pages.
The Arbitron Company, Arbitron Patent Specification ZA 92-7317; Method and Apparatus for Automatically Identifying a Program Including Sound Signal, 30 pages.
Watson, Matthew A. and Buettner, Peter, "Design and Implementation of AAC Decoders," THPM 20.6, 2000, Dolby Laboratories, Inc., San Francisco, CA, 2 pages.
Xu, Changsheng; Wu, Jiankang; and Feng, David Dagan, "Content-Based Digital Watermarking for Compressed Audio," Kent Ridge Digital Labs and the University of Sydney, Singapore and Sydney, Australia, 13 pages.
DeCarmo, Linden, "Pirates on the Airwaves," 7 pages.
Cheung, W.N., "Digital Image Watermarking in Spatial and Transform Domains," 5 pages.
Abdulaziz, Hidhal and Pang, K. Khee, "Wavelet Transform and Channel Coding for Hiding in Video," 6 pages.
Linang, Jianxun and Hu, Bo, "Video Watermarking Combining with Hybrid Coding Scheme," 4 pages.
Patent Cooperation Treaty, International Search Report for PCT/US2004/18645, Apr. 19, 2005, 4 pages.
Patent Cooperation Treaty, Written Opinion for PCT/US2004/18645, Apr. 19, 2005, 5 pages.
Patent Cooperation Treaty, International Search Report for PCT/US2004/018953, Apr. 29, 2005, 2 pages.
Patent Cooperation Treaty, Written Opinion for PCT/US2004/018953, Apr. 29, 2005, 7 pages.
United States Patent and Trademark Office, "Notice of Allowance" issued in connection with U.S. Appl. No. 11/535,269, mailed Aug. 6, 2010, 4 pages.
United States Patent and Trademark Office, "Non-Final Office Action," issued in connection with U.S. Appl. No. 11/535,269, mailed Jan. 22, 2010, 4 pages.
United States Patent and Trademark Office, "Non-Final Office Action," issued in connection with U.S. Appl. No. 11/535,269, mailed Jun. 25, 2009, 9 pages.
United States Patent and Trademark Office, "Non-Final Office Action," issued in connection with U.S. Appl. No. 11/535,269, mailed Jan. 9, 2009, 11 pages.
United States Patent and Trademark Office, "Non-Final Office Action," issued in connection with U.S. Appl. No. 11/535,269, mailed Jul. 30, 2008, 10 pages.

* cited by examiner

| Mantissa Decimal | Bit Pattern | Mantissa Value |
|---|---|---|
| 0 | 0000 | -14/15 |
| 1 | 0001 | -12/15 |
| 2 | 0010 | -10/15 |
| 3 | 0011 | -8/15 |
| 4 | 0100 | -6/15 |
| 5 | 0101 | -4/15 |
| 6 | 0110 | -2/15 |
| 7 | 0111 | 0 |
| 8 | 1000 | +2/15 |
| 9 | 1001 | +4/15 |
| 10 | 1010 | +6/15 |
| 11 | 1011 | +8/15 |
| 12 | 1100 | +10/15 |
| 13 | 1101 | +12/15 |
| 14 | 1110 | +14/15 |

DATA INSERTION APPARATUS AND METHODS FOR USE WITH COMPRESSED AUDIO/VIDEO DATA

RELATED APPLICATION

This patent issued from a continuation of U.S. application Ser. No. 11/535,269, filed on Sep. 26, 2006, which is a continuation of International Application Number PCT/US2005/011630, filed on Apr. 7, 2005, which claims the benefit of U.S. Provisional Patent Application No. 60/560,150, filed on Apr. 7, 2004, all of which are hereby incorporated herein by reference in their respective entireties.

FIELD OF THE DISCLOSURE

The present disclosure relates generally to the delivery and distribution of compressed digital audio/video content such as digital broadcast systems and, more specifically, to data insertion and watermarking apparatus and methods for use with compressed audio/video data.

BACKGROUND

Digital broadcast systems typically transmit one or more high-bandwidth signals, each of which is typically composed of a stream of data or data packets having a plurality of video, audio and/or other digital programs or content multiplexed therein. A number of well-known data compression techniques (e.g., audio/video content compression techniques), transmission protocols and the like are typically employed to generate and transmit a multi-program data stream or bit stream, which is commonly referred to as a transport stream. In particular, digital television programming is typically transmitted according to a standard promulgated by the Advanced Television Standards Committee (ATSC). The ATSC standard is a comprehensive standard relating to the conveyance of digital television signals. Under the ATSC standard, video information associated with a program is encoded and compressed according to the well-known Moving Pictures Expert Group-2 (MPEG-2) standard and audio information associated with the program is encoded and compressed according to the well-known AC-3 standard. As a result, an ATSC data stream or bit stream contains video information in the form of MPEG-2 packets and audio information in the form of AC-3 packets. However, other digital transmission protocols, data compression schemes and the like may be used instead.

Some digital broadcasters enable the identification of digital broadcast programs (e.g., at home sites, reference sites, etc.) by inserting or embedding digital program identification information and/or other data (e.g., watermark data) in the video and/or audio bit stream. The inserted or embedded digital data is commonly referred to as audience measurement data or content identification data, which may include signal identification codes (i.e., digital codes that are uniquely associated with respective audio/video content portions or programs), date information, time information, consumer identification information, etc. The insertion of audience measurement data at the distribution system headend or broadcast station is commonly referred to as an active audio/video content identification process because the system headend or broadcast station actively modifies (i.e., inserts or embeds data in) the transmitted bit streams or transport streams.

Typically, known active data insertion or embedding techniques insert or embed digital data within each of the video and/or audio signals that make up the one or more programs (i.e., video and/or audio programs) being transmitted by the broadcast station before the individual video and/or audio signals are compressed and multiplexed to form a single multi-program bit stream or transport stream. However, because the digital data are inserted in an uncompressed domain (i.e., within the individual uncompressed audio/video signals), multiple digital data insertion or embedding devices (e.g., one for each uncompressed program bit stream) are typically required. This requirement for multiple digital information insertion devices is undesirable because it increases the complexity and operational costs associated with headend or broadcast stations.

Another difficulty that results from inserting or embedding digital data into individual uncompressed program signals is that subsequent compression operations (e.g., compression encoding) may corrupt and/or eliminate some or all of the inserted or embedded data. As is known, signal compression techniques usually provide a substantial reduction in the quantity of data needed to reproduce a video image and/or an audio signal, but do so at the expense (i.e., the loss) of at least some data or information. Thus, if compression operations corrupt the inserted digital data, the home site and/or a central data processing or collection facility may not be able to accurately identify audio/video content.

As noted above, the digital data inserted or embedded by existing broadcast systems may include watermark data or information, which is typically inserted or embedded in audio and/or video content data stream. However, many existing watermarking techniques are designed for use with analog broadcast systems. In particular, existing watermarking techniques typically convert analog program data to an uncompressed digital data stream, insert watermark data in the uncompressed digital data stream, and convert the watermarked data stream back into an analog format prior to transmission. Thus, when used with digital audio and/or video systems, existing watermarking techniques may decompress the compressed digital data stream into time-domain samples, insert the watermark data into the time-domain samples, and recompress the watermarked time-domain samples into a watermarked compressed digital data stream. However, such decompression/compression cycles may cause degradation in quality of the original audio and/or video content.

DETAILED DESCRIPTION

Figure 1:
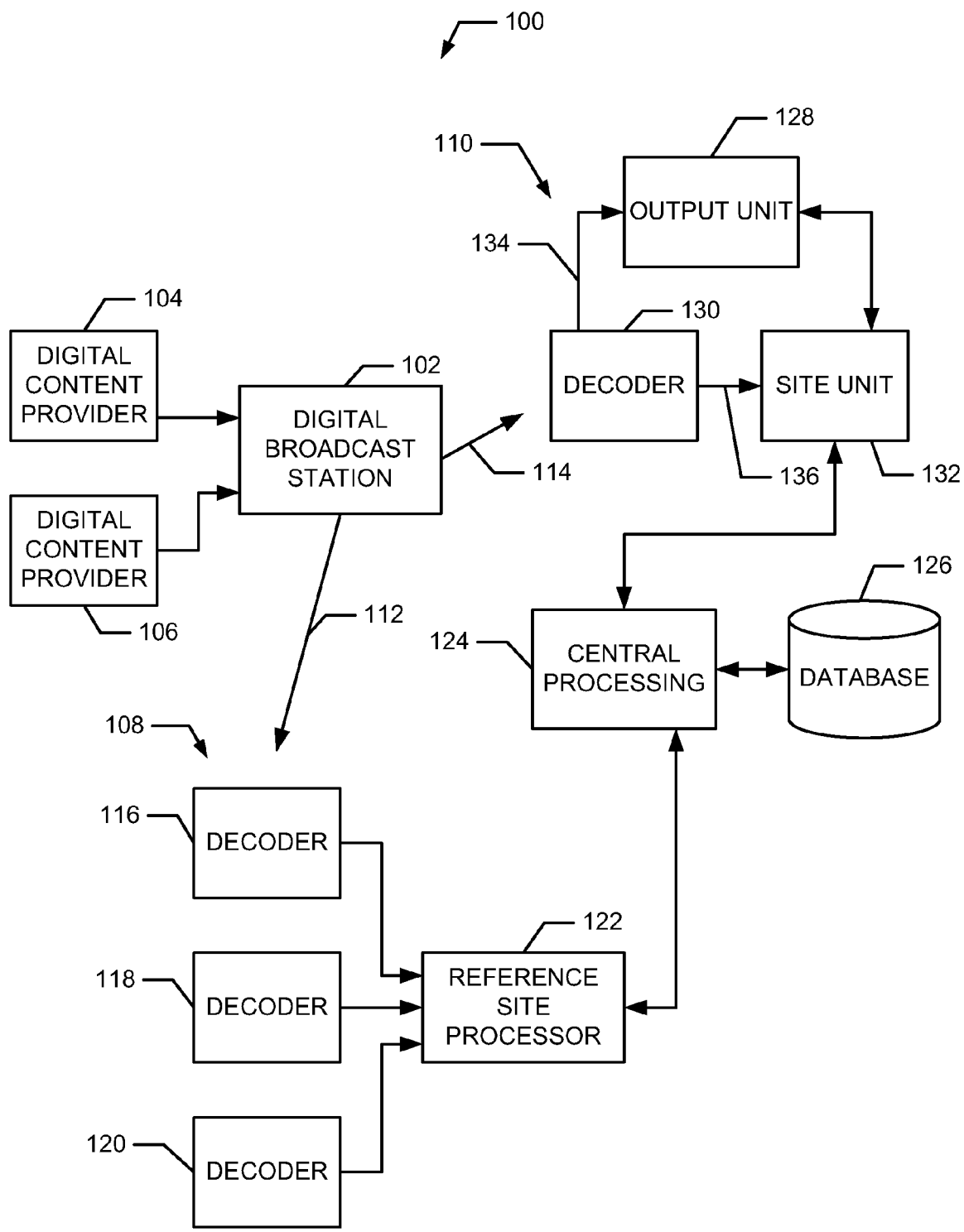
FIG. 1 is a block diagram of an example system within which the data insertion and watermarking apparatus and methods described herein may be used to identify digital audio/video content or programs and to generate verification information and/or viewing behavior information based on the identified audio/video content or programs.

FIG. 1 is a block diagram of an example system 100 within which the data insertion apparatus and methods described in greater detail below may be used to identify broadcast digital audio/video content or programs and to generate viewing behavior and ratings information based on the identified audio/video content. The system 100 includes a digital broadcast station 102 that receives digital video and/or audio content from a plurality of digital content providers 104 and 106. The digital content providers 104 and 106 may provide a variety of audio/video content such as, for example, television programs, advertisements, audio (e.g., radio) programs, still image information (e.g., web pages), etc. in known manners to the digital broadcast station 102. The digital broadcast station 102 transmits one or more signals containing digital audio/video content to a reference site 108 and at least one consumption site (e.g., a monitored household) 110 via communication paths or links 112 and 114. The communication paths or links 112 and 114 may include any combination of hardwired or wireless links such as, for example, satellite links, wireless land-based links, cable links, etc. The signals conveyed via the links 112 and 114 may contain multi-program data streams or bit streams, which are often referred to as transport streams and commonly employed with existing digital television transmission systems.

The reference site 108 and the consumption site 110 receive and process the digital signals or digital audio/video content provided by the digital broadcast station 102 using the audio/video content identification apparatus and methods described herein. More specifically, the reference site 108 includes a plurality of decoders (e.g., set-top boxes or the like) 116, 118 and 120 that demodulate, demultiplex and decode audio, video and/or other data packets received from the digital broadcast station 102. In one example, each of the decoders 116, 118 and 120 provides audio and/or video data packets associated with a different program, which is currently being broadcast, to a reference site processor 122. In other words, the decoder 116 may provide data packets associated with a first program while the decoders 118 and 120 provide data packets associated with respective second and third programs. The reference site processor 122 is configured to control and/or has information indicating to which channel, sub-channel, etc. each of the decoders 116, 118 and 120 is currently tuned.

The reference site processor 122 may include apparatus and methods for extracting the data inserted by the digital broadcast station 102 into the broadcast audio/video content (e.g., one or more transport streams). In particular, the reference site processor 122 may be configured to extract digital codes and/or other data or information inserted by the digital broadcast station 102 from known locations within data packets and/or data frames. The reference site processor 122 may send the extracted codes and/or other digital information to a central processing unit 124 that, in turn, may process the extracted codes and/or other digital information to generate, for example, broadcast verification information, program lineup information, or any other desired information relating to the audio/video content broadcast by the station 102.

The consumption site 110 could be, for example, a statistically selected home or residence, a business location, a mobile device (e.g., a portable computer, cellular phone or personal data assistant, etc.) or any other site or device enabling the consumption of video and/or audio content or programs. For purposes of simplifying the discussion, FIG. 1 depicts a single system or consumption site 110. However, a plurality of consumption sites may be configured in manners similar or identical to that of the example consumption site 110.

The consumption site 110 includes an output unit 128 such as, for example, a video display, television, speaker, etc. The consumption site 110 also includes a decoder (e.g., a set-top box) 130, which may be similar or identical to the decoders 116-120. As shown in FIG. 1, the decoder 130 may be serially interposed between the broadcast signal 114 and the output unit 128 and provides audio and/or video signals 134 to the output unit 128 that are used to present the audio and/or video content or program currently selected for consumption. For example, in the case where the broadcast signal 114 is a digital satellite or cable television transmission, the decoder 130 demodulates extracts video and/or audio data packets associated with a desired channel and/or program. The extracted data packets are processed to form the signal 134 that can be presented (e.g., displayed) by the output unit 128. For example, in the case where the output unit 128 is a television, the signal 134 may be a composite video signal, an S-video signal, a red, green, blue (RGB) signal, or any other displayable video signal applied to the appropriate input connections of the output unit 128.

In addition, the decoder 130 also provides signals 136 containing digital audio/video content data to the site unit 132. The audio/video content data may, for example, be digital audio signals provided using the well-known Sony Corporation and Philips Corporation Digital Interface Format (S/PDIF), or any other desired format that provides data packets associated with digital broadcasts. In that case, the audio/video content data is compressed digital audio data associated with audio/video content to which the decoder is currently tuned and which is being consumed via the output unit 128.

In addition to its signal processing functions, the decoder 130 may also perform access control functions such as, for example, determining what programs are available for consumption by a user of the system 100 based on subscription status or subscription information associated with the system 100, generating displayable program guide information, etc.

The site unit 132 processes the signals 136 received from the decoder 130 to extract the inserted data (e.g., audience measurement data) therefrom. The site unit 132 may then convey the extracted digital data (e.g., audience measurement data) to the central processing unit 124. The central processing unit 124 may process the extracted digital data to determine what audio/video content (e.g., channels and/or programs) was consumed, the times at which the audio/video content was consumed, and/or the identities of those who consumed the audio/video content. In this manner, the central processing unit 124 may generate viewing behavior information or statistics, ratings information or any other desired information relating to the consumption of audio/video content at the consumption site 110 or at one or more other consumption sites (none of which are shown).

While the output unit 128, the decoder 130 and the site unit 132 are depicted in FIG. 1 as separate blocks, the functions performed by these blocks may be combined or integrated in any desired manner. For example, in the case where the consumption site 110 is a portable device (e.g., a personal data assistant having a wireless communication interface), the functions performed by the blocks 128, 130 and 132 may be integrated within the portable device. Alternatively, the functions performed by the output unit 128 and the decoder 130 may be integrated within the portable device, which is then periodically or continuously communicatively coupled to the site unit 132 to download its extracted data to the site unit 132. In that case, the site unit 132 may be implemented as a base unit in which the portable device is periodically disposed to perform download operations.

Figure 2:
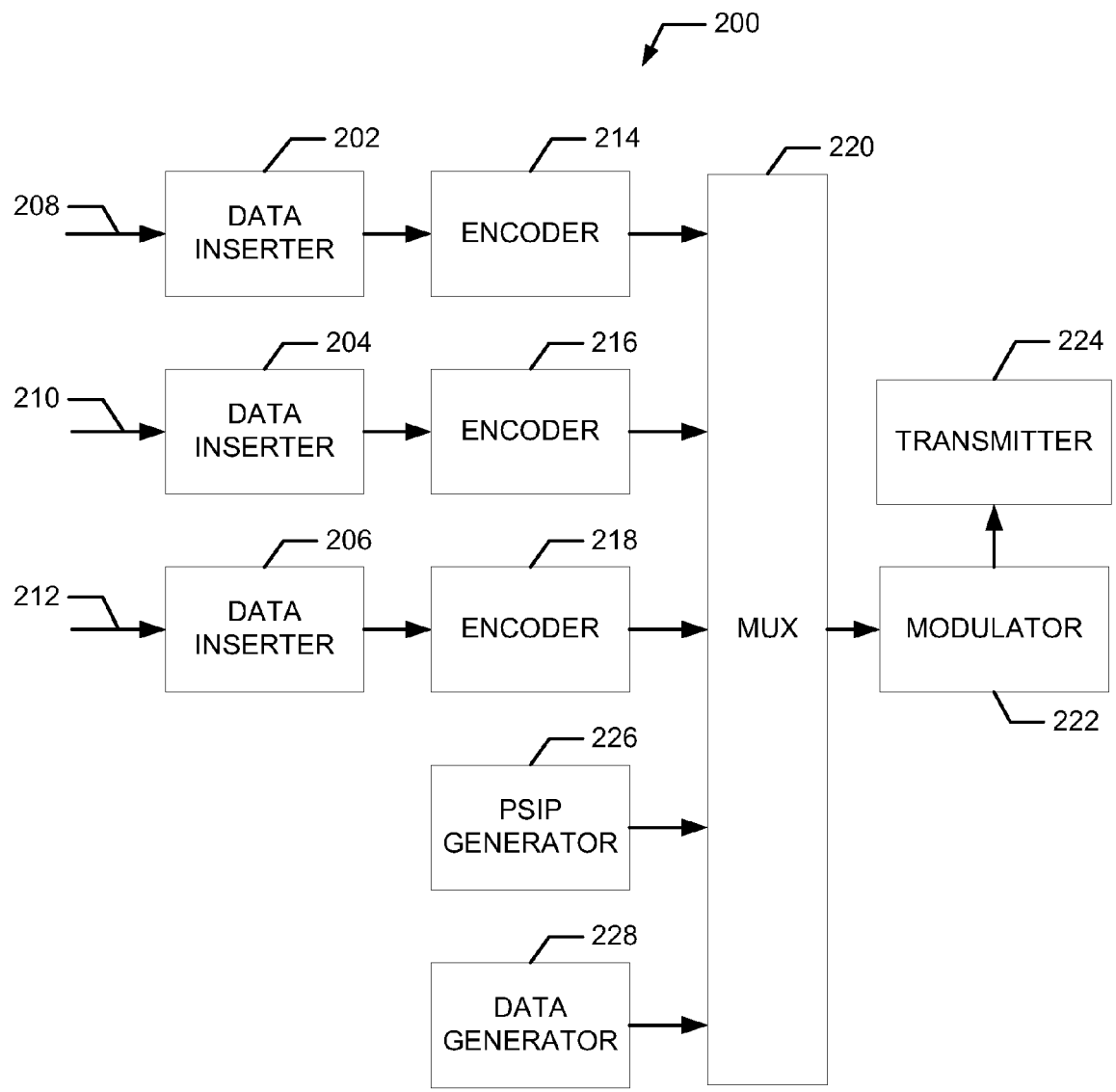
FIG. 2 is a block diagram of an example known system that may be used by the digital broadcast station of FIG. 1 to insert audience measurement data in one or more uncompressed audio/video content or program bit streams.

FIG. 2 is a block diagram of an example known system 200 that may be used by the digital broadcast station 102 of FIG. 1 to insert audience measurement data into one or more uncompressed audio/video content or program bit streams. The system includes a plurality of data inserters 202, 204 and 206, each of which is configured to insert data into respective uncompressed audio/video content data streams 208, 210 and 212. Each of the streams 208, 210 and 212 contains a single audio/video program, which may be provided by a digital content provider similar or identical to the digital content providers 104 and 106 shown in FIG. 1 and/or which may be provided a local source such as, for example, a digital video recorder, a video cassette recorder, or any other suitable digital media delivery devices.

The data inserters 202, 204 and 206 may be implemented using known data insertion devices such as vertical blanking inserters, watermarking encoders and closed caption encoders. The outputs of the data inserters 202, 204 and 206 are coupled to respective encoders 214, 216 and 218. The encoders 214, 216 and 218 are compression encoders that compress each of the individual audio/video content bit streams (into which data has been inserted) using a known audio/video compression scheme such as for example, a compression scheme compliant with the AC-3 and/or MPEG standards.

The compressed audio/video content bit streams output by the encoders 214, 216 and 218 are multiplexed to form a single bit stream or transport stream by a multiplexer 220. The multiplexer 220 may multiplex the compressed bit streams received from the encoders 214, 216 and 218 using a multiplexing scheme compliant with, for example, the ATSC and/or Digital Video Broadcast (DVB) standards. The multiplexer 220 provides its multi-program bit stream or transport stream to a modulator 222, which modulates the transport stream using known techniques, and a transmitter 224, which uses known techniques to transmit or broadcast the transport stream via, for example, the communication links 112 and 114 shown in FIG. 1.

The system 200 may also includes a Program and System Information Protocol (PSIP) generator 226, which uses well known techniques to generate a collection of hierarchically interlinked tables that contain information relating to the location of channels and programs, program scheduling (e.g., program lineup information), information facilitating the construction of program guides, as well as unique identifiers such as transport stream identifiers (TSIDs), each of which uniquely corresponds to a broadcaster. The PSIP generator 226 provides the PSIP information to the multiplexer 220, which multiplexes the PSIP information into the transport stream.

In addition, the system 200 may include a data generator 228, which may provide interactive program information to the multiplexer 220, which multiplexes the interactive program information into the transport stream. For example, the data generator 228 may generate program information that may be used at a consumption site (e.g., the consumption site 110 shown in FIG. 1) to generate a program grid-guide and/or to provide other user interface functionality at the consumption site.

While the known system 200 of FIG. 1 enables audience measurement data to be inserted into individual audio/video program bit streams, the inserted data may be corrupted or lost during the encoding or compression process performed by each of the encoders 214, 216 and 218. In addition, because the data inserters 202, 204 and 206 insert audience measurement data without reference to the information being generated by the PSIP generator 226, changes in program lineup (e.g., reassignment of a program by a station to a different sub-channel, removal of a program, etc.) are not considered during the data insertion process. As a result, the inserted audience measurement data extracted at a consumption site may not reflect the programs or audio/video content actually consumed. To address this issue, two sets of metadata would have to be maintained to generate ratings information. In particular, one set of metadata associated with the inserted data and another set of metadata generated by the PSIP device (e.g., station or broadcaster metadata that is used for program identification). In addition, a mapping between the two sets of metadata would be required so that ratings information could ultimately be provided in terms the metadata generated by the PSIP device. Still further, the system 200 requires a separate data inserter for each program bit stream and, thus, may become overly complex in cases where the broadcast station (e.g., the broadcast station 102 of FIG. 1) multiplexes a large number of programs to form its transport stream or if a new channel is introduced for transmission.

Figure 3:
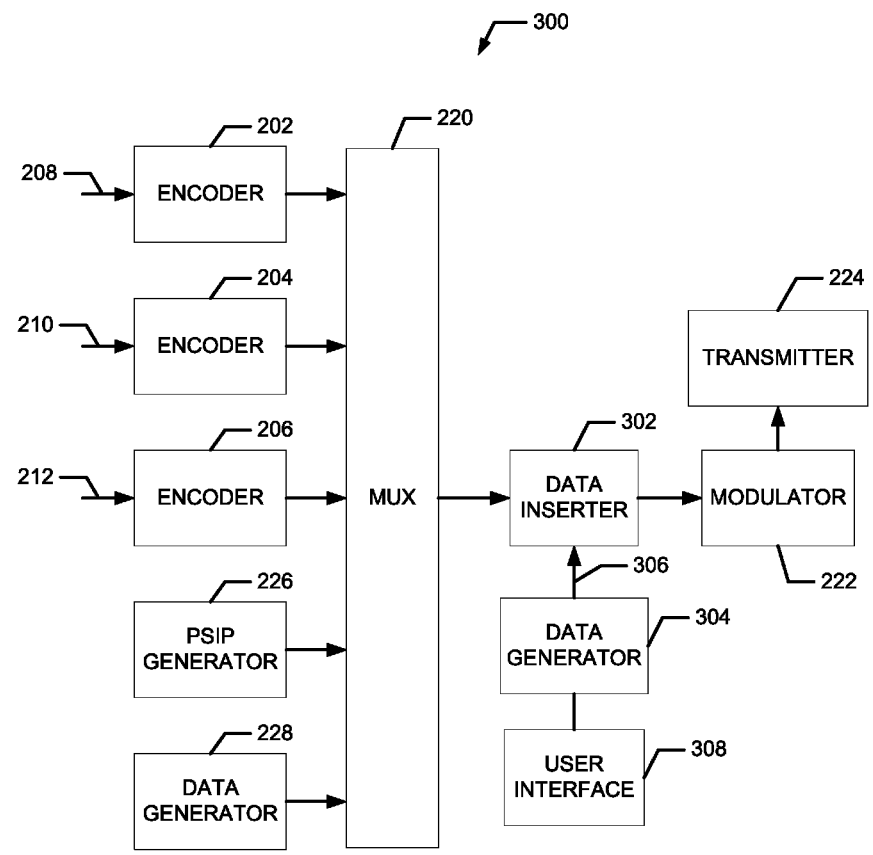
FIG. 3 is a block diagram of an example system that may be used within the digital broadcast station of FIG. 1 to insert audience measurement data in a compressed audio/video content or program bit stream.

FIG. 3 is a block diagram of an example system 300 that may be used within the digital broadcast station 102 of FIG. 1 to insert audience measurement data (e.g., ancillary codes, metadata, watermark data, etc.) in a compressed audio/video content bit stream. Many of the functional blocks shown in the system 300 of FIG. 3 are similar or identical to those shown and described in connection with FIG. 2. However, the system 300 interposes a data inserter 302 between the multiplexer 220 and the modulator 222, thereby eliminating the need for the plurality of data inserters 202, 204 and 206 (FIG. 2). In contrast to the data inserters 202, 204 and 206, the data inserter 302 operates in a compressed domain. In particular, the data inserter 302 inserts data (e.g., audience measurement data and/or other data) in a multi-program bit stream or transport stream that contains compressed audio/video data, PSIP information generated by the PSIP generator 226 and/or other data (e.g., watermark data) generated by the data generator 228. The physical interfaces of such a data insertion device may be implemented using known interfaces such as DVB ASI and SMPTE 310.

As described in greater detail below, the data inserter 302 operates on a bit stream containing frames of data packets that are formatted using a predefined compression and transmission protocol. In some embodiments, the data inserter 302 temporally packs, time shifts or rearranges data within data frames to expand (i.e., increase the size of) a predetermined data area or location within one or more of the data frames and inserts audience measurement data within the one or more expanded predetermined data areas or locations. The inserted audience measurement data may then be extracted by one or more decoders at one or more consumption sites and reference sites and used to generate consumption records, verification information, program lineup information, viewing behavior information etc. Further, as described in greater detail below, the data inserter 302 may alternatively or additionally be configured to insert or embed watermark data in the audio and/or video content of some or all of the frames of data packets without decompressing the audio and/or video data contained therein.

Because the data inserter 302 operates in a compressed domain (i.e., it operates on bit streams containing compressed data), the audience measurement data that it inserts cannot be corrupted or lost as a result of compression operations, as is the case with known systems (e.g., the known system 200 shown and described in connection with FIG. 2). In addition, because the data inserter 302 has access to the information generated by the PSIP generator 226, the data inserter 302 always inserts audience measurement data that is consistent with the program lineup information contained with the PSIP tables provided by the PSIP generator 226. In this manner, the system 300 maintains two metadata systems (i.e., the metadata produced by the PSIP device and the metadata produced as a result of the data insertion process) that contain the same information. As a result, the system 300 provides audience measurement data that is more reliable than that provided by the known system 200 of FIG. 2, particularly in cases where the broadcast station 102 (FIG. 1) makes frequent changes to its program lineup.

The system 300 may also include a data generator 304 that generates non-audience measurement data such as, for example, interactive data (e.g., uniform resource locators (URLs), Internet protocol (IP) data, etc.), private or proprietary data, or any other non-audience measurement data. In one example, the data generator 304 may generate data using the format shown below.

Time Code: XX
Minor Channel/Major Channel: XX/YY
Data: http://xx.xx.xxx

The data generator 304 may be separate from the data inserter 302 as shown in FIG. 3, in which case the data generator 304 may be communicatively coupled to the data inserter 302 via a communication link 306 such as for example, a serial interface, an Ethernet compatible link, or any other suitable communication link and using protocols such as PMCP. Alternatively, the data generator 304 may be integral with the data inserter 302. The data generator 304 may also be coupled to a user interface 306, which may include a keyboard, monitor, mouse, etc. that enable an operator to enter data to be inserted via the data generator 304 and the data inserter 302.

Figure 4:
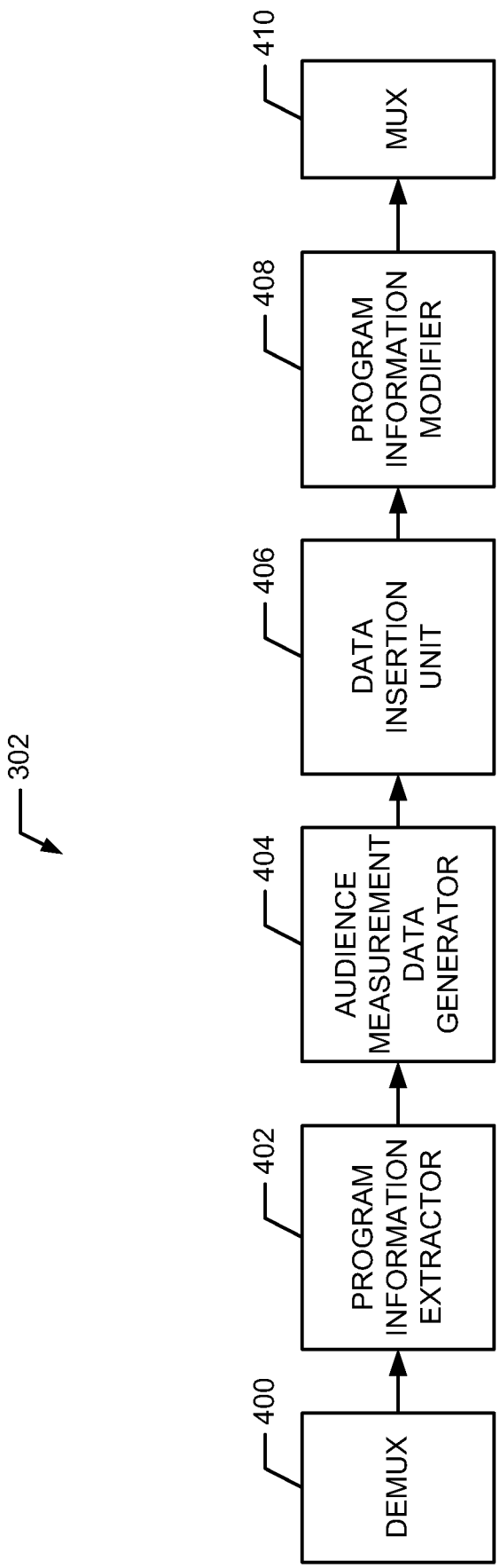
FIG. 4 is a more detailed block diagram that depicts an example manner in which the data inserter shown in FIG. 3 may be implemented.

Now turning to FIG. 4, a more detailed block diagram depicts an example manner in which the data inserter 302 shown in FIG. 3 may be implemented. The example data inserter 302 includes a demultiplexer 400 that receives a multi-program bit stream (e.g., an ATSC compliant data stream) from the multiplexer 220 (FIG. 3). The demultiplexer 400 separates the multi-program bit stream into a plurality of bit streams, including bit streams containing compressed data associated with individual audio/video programs, a bit stream containing PSIP information, a bit stream containing data generated by the data generator 228, etc.

A program information extractor 402 receives the individual bit streams output by the demultiplexer 400 and extracts program information therefrom. In particular, the program information extractor 402 may extract a transport stream identifier, which uniquely corresponds to the broadcasting source (e.g., the station 102 of FIG. 1) from which the multi-program bit stream was transmitted, major and minor channel information for each of the bit streams corresponding to an audio/video program, date and time values for each of the audio/video program bit streams, as well as any other desired program information.

The audience measurement data generator 404 uses the extracted program information provided by the program information extractor 402 to generate audience measurement data for each of the audio/video program bit streams contained within the multi-program bit stream received by the demultiplexer 400. The audience measurement data generator 404 may generate audience measurement data using the example syntax set forth in Table 1 below.

TABLE 1

| Data Field | Length in bits |
| --- | --- |
| AudienceMeasurementDataID | 8 |
| PayloadStartIndex | 4 |
| LenIndex | 4 |
| Payload | Variable |

The data field AudienceMeasurementDataID contains a unique identifier that may be used by decoders (e.g., the decoders 116, 118, 120, and 130) to identify audience measurement data and/or the audience measurement entity (e.g., a company) that has inserted the data. Such unique identifiers may be known in advance to facilitate the identification process. The data field PayloadStartIndex holds a value indicating the order in which audience measurement information is stored in the payload. One example manner in which the values of PayloadStartIndex may correspond to payload data organization is set forth in Table 2 below.

TABLE 2

| PayloadStartIndex | Payload Data Starts With |
| --- | --- |
| 0 | TransportID [bit 15-0] |
| 1 | Major channel [bit 15-0] |
| 2 | Minor channel [bit 15-0] |
| 3 | Time [bit 31-16] |
| 4 | Time [bit 15-0] |

The data field LenIndex holds a value that indicates the length of the data field Payload. One example manner in which the data field LenIndex may define the length of the data field Payload in set forth in Table 3 below.

TABLE 3

| LenIndex | Payload Length in Bytes |
| --- | --- |
| 0 | 2 |
| 1 | 4 |
| 2 | 6 |
| 3 | 8 |
| 4 | 10 |

Using the above example data field semantics set forth in Tables 1 through 3, if PayloadStartIndex=3 and LenIndex=3, then the payload contains eight bytes in the order set forth in Table 4 below. Thus, the LenIndex data field enables modulation of the length of the inserted audience measurement data as a function of the number of bytes available in the inserted data location or placeholder.

TABLE 4

| Payload Data | No. of Bytes |
| --- | --- |
| Time [bit 31-16] | 2 |
| Time [bit 15-0] | 2 |
| Transport ID [bit 15-0] | 2 |
| Major Channel [bit 15-0] | 2 |

Tables 1 through 4 above are merely one example manner in which the audience measurement data generator 404 may generate audience measurement data. Other data types and formats may be used to form audience measurement data for any desired application. For example, the Transport ID may be replaced by a proprietary identifier that is used by, for example, an audience measurement entity (e.g., a company) to identify a channel with a particular major/minor channel number. Alternatively, the Transport ID may be replaced with a public content identifier such as, for example, an ISCII, AD-ID or V-ISAN, which are well known content identification schemes. The timestamp or time information could be the Time of Day (TOD) as generated by the real-time clock, a replication of the NTT which is present in the PSIP, an SMPTE timestamp, or a Time in Program (TIP).

A data insertion unit 406 inserts the audience measurement data provided by the audience measurement data generator 404 in the individual bit streams, which correspond to the individual audio/video programs provided by the demultiplexer 400. More specifically, the data insertion unit 406 packs, reorganizes or rearranges compressed data within the data frames of each audio/video program bit stream to expand a predetermined portion or data area of one or more data frames within those compressed data bit streams. As described in greater detail below, the packing, reorganization or rearrangement of data within frames may result in certain data being transmitted in a different order and, thus, at a different time than such data would have been transmitted prior to the packing or reorganization of the data. Thus, the rearrangement of data in this manner can result in temporally shifting data within frames so that data within frames is transmitted in a different order than it would have been without the rearrangement. Regardless of the manner in which data is reorganized, packed, etc., the decoding process (e.g., at a consumption site) will render any audio and/or video data packets in a temporally correct order. In any case, audience measurement data pertaining to each of the audio/video bit streams noted above is inserted into one or more of the expanded predetermined portions or data areas.

In addition to receiving audience measurement data to insert, the data insertion unit 406 may also receive other data such as, for example, non-audience measurement data to insert from the data generator 304 (FIG. 3). As described above, such non-audience measurement data may include interactive data such, for example URLs, applets, scripts, etc. Example syntax for such non-audience measurement data is set forth below in Tables 5 and 6.

TABLE 5

| Data Field | Value/Length |
| --- | --- |
| Interactive Data Identifier | 0xBB H |
| Data Length | XX bytes |
| Data Type | YY |
| Data | ZZ |

TABLE 6

| Data Type Value | Data Type Description |
| --- | --- |
| 0 | URL |
| 1 | Scripts |
| 2 | Applets |

Audio/video bit streams having data inserted therein by the data insertion unit 406 are provided to the program information modifier 408, which may, if needed, modify the program information associated with one or more of those bit streams. In some cases, depending on where in the bit stream the data insertion unit 406 inserts the audience measurement data or other data, the program information associated with the bit stream into which the data has been inserted may have to be updated. For example, in the case where the program information includes PSIP and/or PSI table information, it may be necessary to modify the information the PSIP and/or PSI table information to reflect changes to reflect that private data has been inserted in the bit stream.

After being processed by the program information modifier 408, a multiplexer 410 receives the individual bit streams, including audio/video bit streams into which audience measurement data and/or other data has been inserted by the data insertion unit 406. The multiplexer 410 also receives program information, which may have been modified via the program information modifier 408. For example, the multiplexer 410 may receive bit streams containing modified PSIP information. Still other bit streams may be received by the multiplexer 410 such as, for example, a bit stream containing other programs or data. In any event, the multiplexer 410 multiplexes the plurality of bit streams that it receives into a single multi-program bit stream or transport stream that may have substantially the same format (e.g., that is compliant with the same protocol) as the transport stream received by the demultiplexer 400. However, the multi-program bit stream or transport stream output by the multiplexer 410 contains data inserted by the data insertion unit 406 and may contain program information modified by the program information modifier 408.

Figure 5:
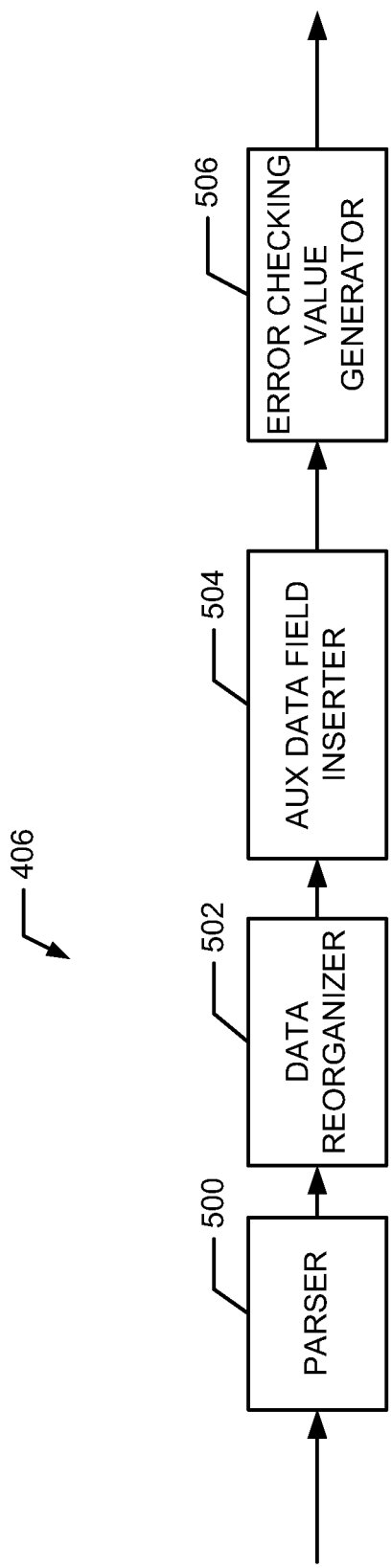
FIG. 5 is a more detailed block diagram depicting an example manner in which the data insertion unit of FIG. 4 may be implemented.

FIG. 5 is a more detailed block diagram depicting an example manner in which the data insertion unit 406 may be implemented. The data insertion unit 406 may include a parser 500 that parses out or extracts a particular type or types of data packets to be passed to a data reorganizer 502. In one example, where data insertion unit 406 is implemented within the digital broadcast station 102 of FIG. 1 and where the digital broadcast station 102 is configured to transmit ATSC compliant digital television signals, the parser 500 is configured to extract compressed audio data packets compliant with the AC-3 standard. In that example, the data reorganizer 502 is configured to reorganize or rearrange the compressed audio data packets within AC-3 data frames to reduce the number of or to eliminate skip bytes within the AC-3 data frames.

As is well known, compressed audio bit streams compliant with the AC-3 standard typically include frames having one or more skip bytes, which are formed during the encoding process to maintain a fixed frame size for each AC-3 frame and which typically do not contain any useful information. In addition, AC-3 data frames contain an auxiliary data field, which may be used to transmit information other than compressed audio data and/or may be used to fine tune the number of bits contained in a frame. However, in practice, the auxiliary data fields are absent in the stream when the "auxiliary data exists" flag is set to zero. By eliminating skip bytes that occur at the end of each block of audio within an AC-3 frame (there are six blocks of audio within each AC-3 frame), data space can be created at the end of the AC-3 frame to accommodate auxiliary data.

As noted above, the data reorganizer 502 reduces the number of or eliminates skip bytes within AC-3 frames and shifts, rearranges, or reorganizes audio data within the AC-3 frames to occupy the eliminated skip bytes. The result of the shifting is a packing of the compressed audio data toward one end of the frames to occupy portions of the frames previously occupied by skip bytes, which effectively temporally shifts the relative times at which the shifted audio data within a frame are transmitted. Another result of this shifting is an increase in the number of bits available for the auxiliary data fields. It should be recognized that the reorganization of data within frames as described above does not result in any temporal shifting of the manner in which audio data are reconstructed and/or rendered. For example, in the case where data within AC-3 frames have been reorganized in the manner described above (e.g., packed), the audio content associated therewith is reconstructed (e.g., rendered) in a temporally correct manner, regardless of the manner in which the data within frames was reorganized and transmitted.

An auxiliary data field inserter 504 inserts the audience measurement data generated by the audience measurement data generator 404 into the newly expanded auxiliary data fields of the AC-3 frames. The inserted audience measurement data may be formatted as described above in connection with Tables 1 through 4 above, or in any other desired manner. Alternatively or additionally, non-audience measurement data provided by the data generator 304 (FIG. 3) may be inserted in the auxiliary data fields of the AC-3 frames by the auxiliary data field inserter 504.

After the audience measurement data and/or other data has been inserted in the newly expanded auxiliary data field of the AC-3 frames, an error checking value generator 506 generates new error checking values for each AC-3 frame. In this example, the error checking value generator 506 is configured to re-compute the cyclical redundancy check (CRC) values, which represent within each AC-3 frame. Re-computation of the CRC values for the AC-3 frames is necessary because elimination of skip bytes, shifting compressed audio data and inserting data in the AC-3 frame auxiliary data fields renders the original CRC values meaningless (i.e., the original CRCs are no longer representative of the data contained in the frames).

In general, the example data inserter 302 (FIG. 3) and data generator 304 (FIG. 3) may be implemented using primarily hardware, primarily software or any desired combination of hardware and software. In the case of a primarily software-based implementation, a computer system or other processor system that executes machine readable instructions or programs may be used to implement the apparatus and methods described herein. The machine readable instructions or programs may be embodied in software stored on a tangible medium such as a CD-ROM, a floppy disk, a hard drive, a digital versatile disk (DVD), or a memory.

Figure 6:
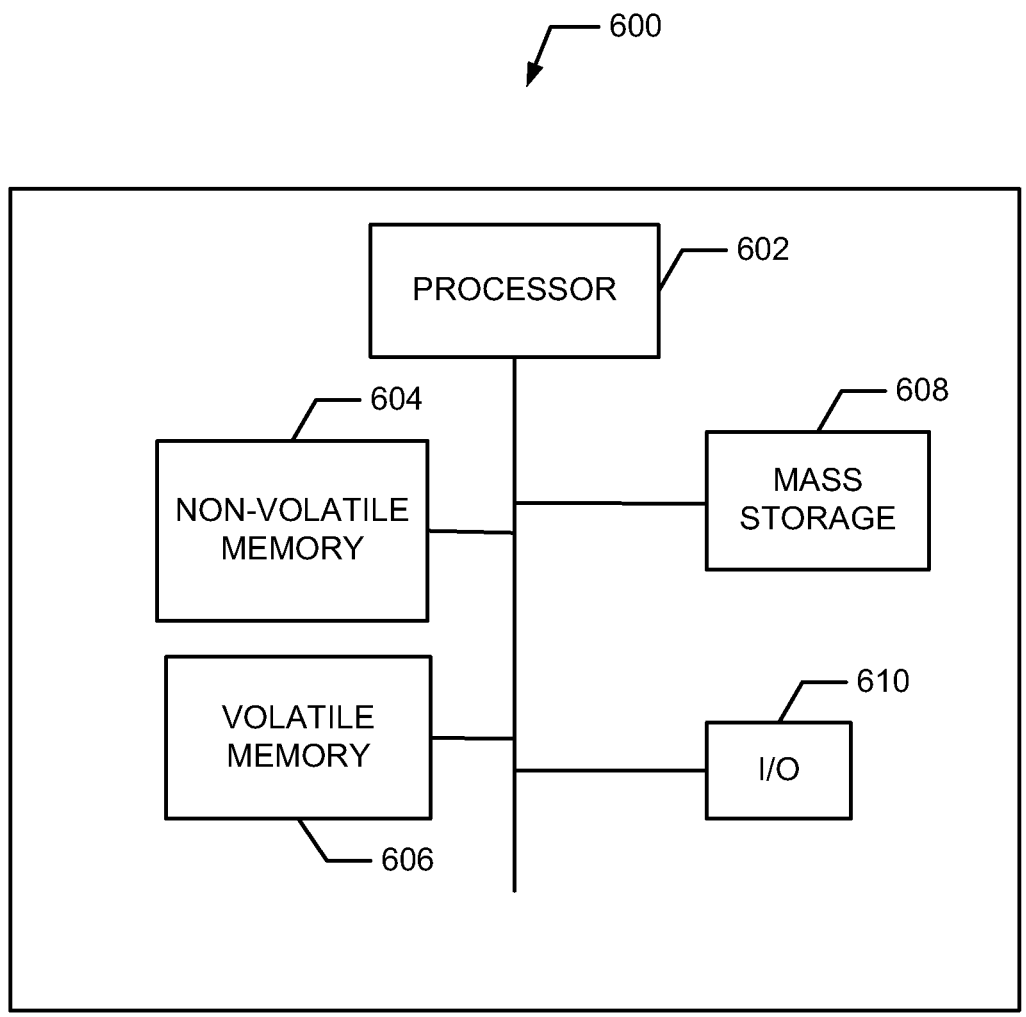
FIG. 6 is a block diagram of an example processor-based system that executes software or instructions stored on a machine readable medium to implement the example data inserter shown in FIG. 3.

FIG. 6 is a block diagram of an example processor-based system 600 that executes software or instructions stored on a machine readable medium to implement the example data inserter 302 (FIG. 3) and/or the example data generator 304 (FIG. 3). The example processor-based system 600 includes a processor 602, which may be any suitable microprocessor such as, for example, a processor from the Intel Pentium® family of microprocessors. The processor 602 is communicatively coupled to a non-volatile memory 604 and a volatile memory 606. The non-volatile memory 604 may be implemented using, for example, electrically erasable programmable read only memory (EEPROM), read only memory (ROM), etc. The volatile memory 606 may be implemented using, for example, static random access memory (SRAM), dynamic random access memory (DRAM), etc. The processor 602 is also coupled to a mass storage device 608, which may be implemented using, for example, a disk drive that stores digital information using a magnetic or optical media.

The processor 602 retrieves and executes machine readable instructions or software programs that are stored on one or more of the memories 604 and 606 and/or the mass storage device 608 to perform the functions of the data inserter 302 and/or data generator 304 shown in FIG. 3.

The processor 602 is also in communication with an input/output (I/O) unit 610, that enables the system 600 to communicate with, for example, the user interface 308 (FIG. 3). The I/O unit 610 may include circuitry for performing network communication functions (e.g., Ethernet communication functions), phone line communication functions (e.g., modem functions), peripheral device communication functions (e.g., universal serial bus communications, parallel port communications, etc.) to enable the system 600 to communicate with one or more input devices such as, for example, a mouse, keyboard, etc. and/or one or more output devices such as, for example, a video display, a printer, etc.

Figure 7:
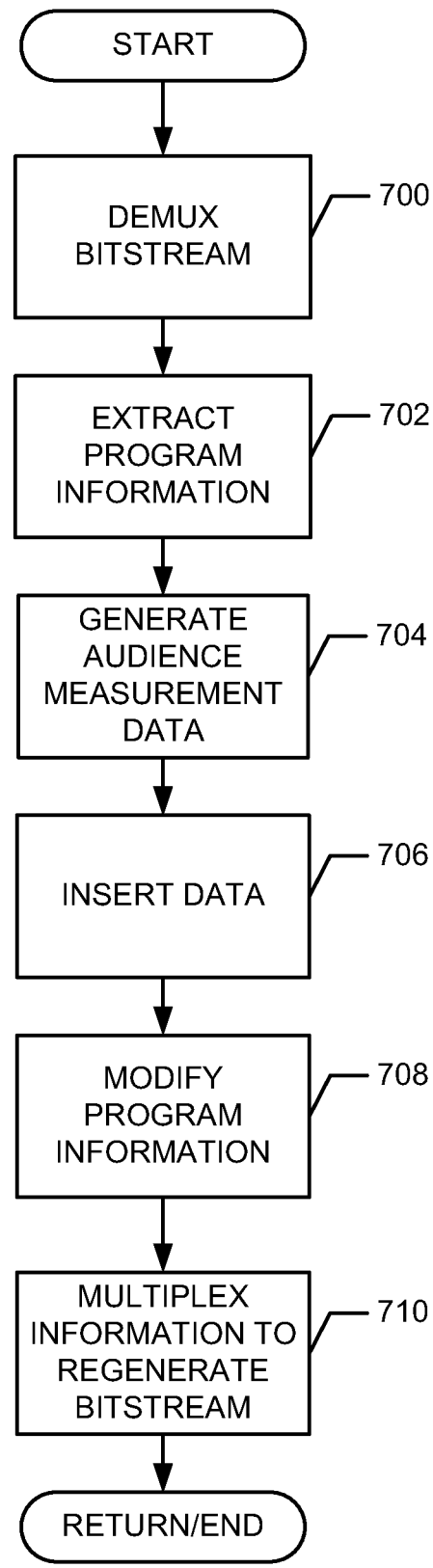
FIG. 7 is a flow diagram of an example manner in which the processor system shown in FIG. 6 may be configured to perform the functions of the example data inserter shown in FIG. 3.

FIG. 7 is a flow diagram of an example manner in which the processor system 600 shown in FIG. 6 may be configured to perform the functions of the data inserter 302 shown in FIG. 3. Initially, the multi-program bit stream or transport stream received from the multiplexer 220 (FIG. 3) is demultiplexed into its constituent bit streams (block 700). In particular, the transport stream may be separated into a plurality of audio/video program bit streams, a bit stream containing PSIP information, as well as other bit streams containing other data and/or program information. Program information such as, for example, transport stream identifiers, major and minor channel numbers, date and time value, etc. are then extracted from the constituent bit streams (block 702). The extracted program information is then used to generate audience measurement data (block 704), which is subsequently inserted in predetermined portions or data fields within the audio/video bit streams (block 706). The program information may then be modified, if necessary, (block 708) and the constituent bit streams, some of which have been modified via insertion of audience measurement data and/or modification of program information, are multiplexed to form a single transport stream (block 710).

Figure 8:
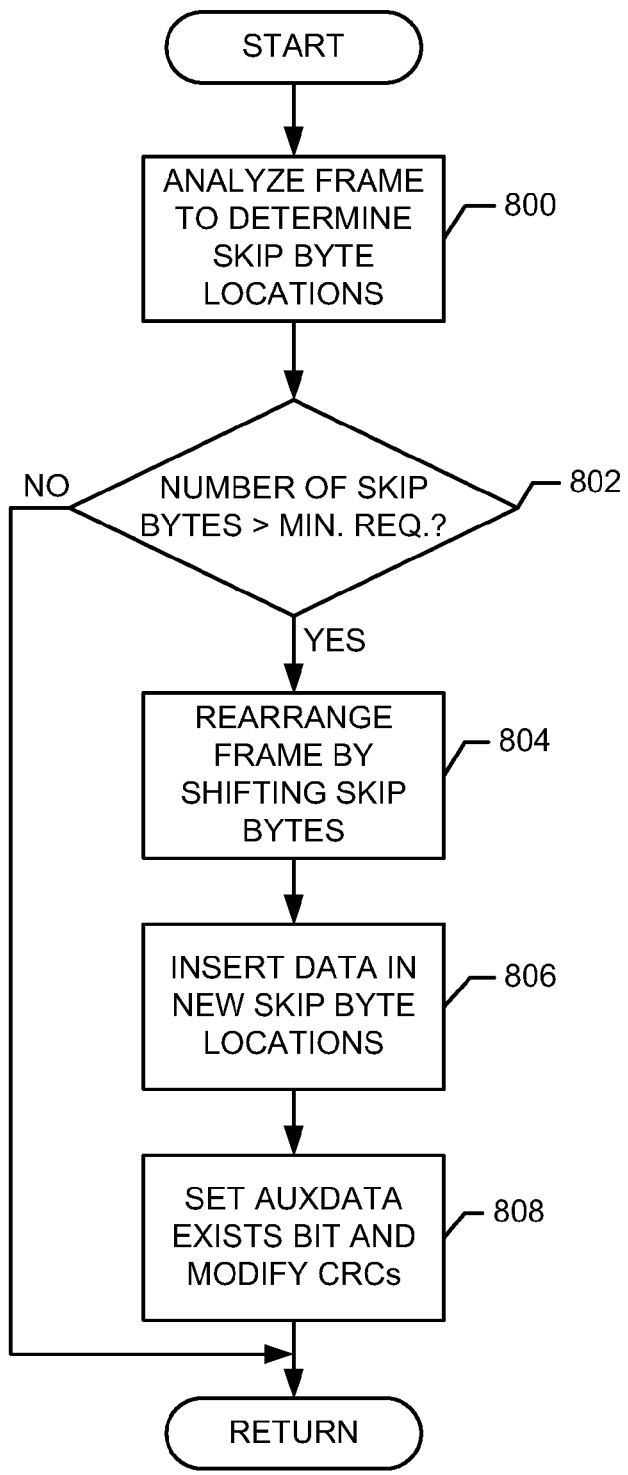
FIG. 8 is a more detailed flow diagram of an example manner in which the data insertion block of FIG. 7 may be implemented.

FIG. 8 is a more detailed flow diagram of an example manner in which the data insertion block 706 of FIG. 7 may be implemented. In particular, the audio/video bit streams are parsed to extract certain data packets into which data will be inserted. In one example, as described above, audio data packets compliant with the AC-3 standard are extracted. Turning in detail to FIG. 8, a data frame (e.g., a frame of AC-3 data) is analyzed to determine the skip byte locations (as well as the number of skip bytes) within the data frame (block 800). The number of skip bytes within the frame is then compared to a predetermined minimum number of skip bytes (block 802). Such a minimum number may be selected to accommodate certain data overhead needed to convey, for example, data within an auxiliary data field. For example, in the case of an AC-3 data stream, conveying data within an auxiliary data field requires the presence of a 14-bit "auxdata length" field. Thus, to send N bits within an auxiliary data field requires a number of skip bytes sufficient to provide at least N+14 bits. As is known, the "auxdata length" field is used to indicate the number of bits of auxdata present within a frame.

In any event, if the number of skip bytes is not greater than the minimum require (i.e., there is not a sufficient number of skip bytes to accommodate the required bit overhead (e.g., the "auxdata length" field) and a number of bits to be transmitted as auxdata), then control is return to a calling process. On the other hand, if the number of skip bytes is determined to be greater than minimum required at block 802, then the data within the frame is rearranged so that all of the skip bytes are shifted to one general location (block 804). For example, all of the skip bytes may be moved or shifted to one end of the data frame. In the case of an AC-3 frame, the skip bytes may be moved adjacent to the "auxdata exists" bit.

After the frame data has been rearranged or shifted at block 804, the data to be inserted is inserted in the new skip byte locations (block 806). Audience measurement data, as well as other data, may then be inserted in the newly expanded auxiliary data field. After inserting the data, the "auxdata exists" bit is set (e.g., to a logical 1) and the CRC's for the frame are recomputed and modified as a result of the movement of data within the frame (block 808).

Figure 9:
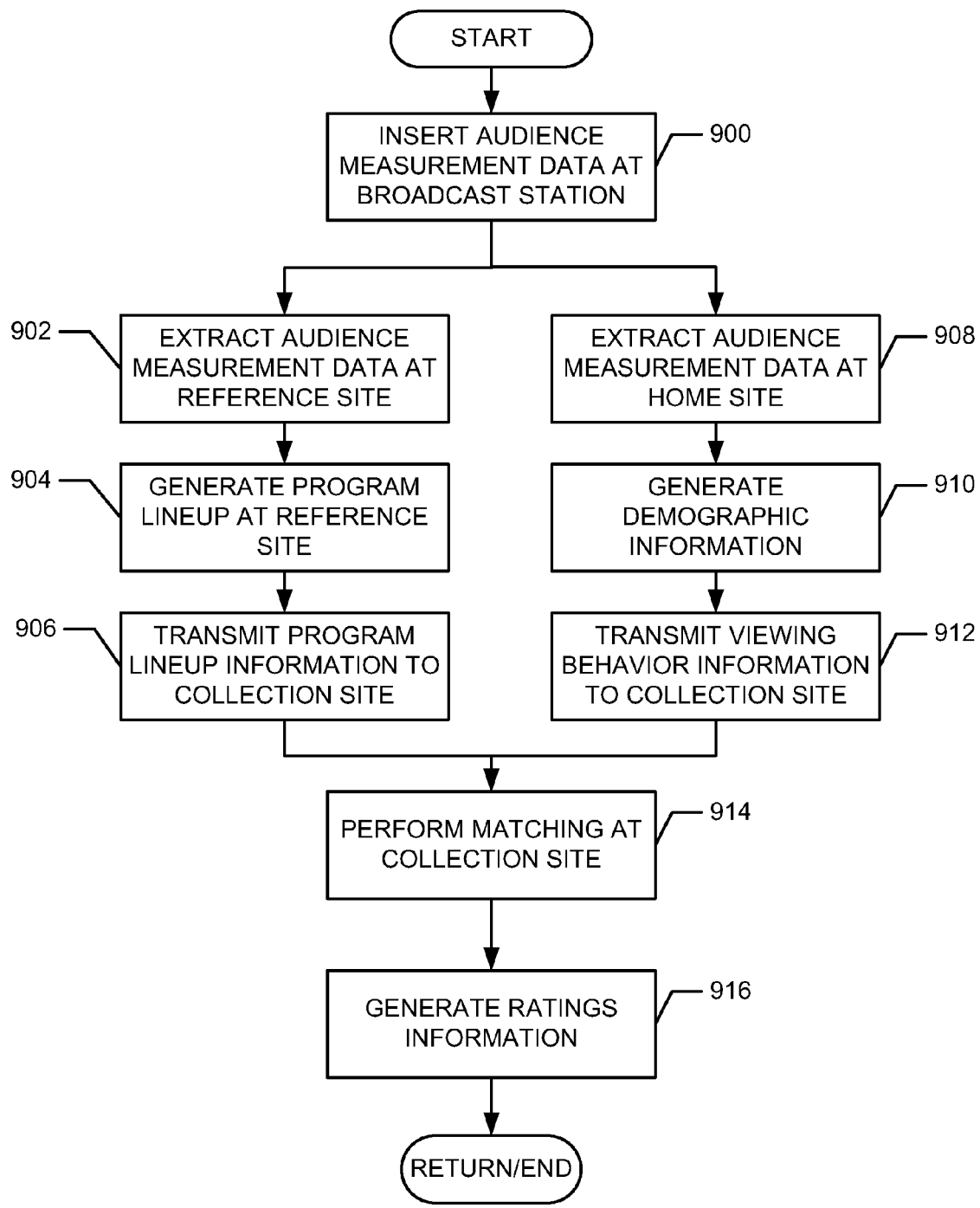
FIG. 9 is a flow diagram of an example method by which the system shown in FIG. 11 may generate viewing behavior and ratings information using data inserted by the example data inserter of FIG. 3.

FIG. 9 is a flow diagram of an example method by which the system 100 shown in FIG. 1 may generate viewing behavior and ratings information using data inserted by the data inserter 302 of FIG. 3. Initially, the digital broadcast station 102 (FIG. 1) inserts audience measurement data into its broadcast transport stream using, for example, the data inserter apparatus and methods described herein (block 900). One or more of the decoders 116, 118 and 120 (FIG. 1) together with the reference site processor 122 (FIG. 1) extract the audience measurement data from known locations within the transmitted bit streams (block 902). For example, in the case where the data inserted within the compressed audio bit streams compliant with the AC-3, the known locations may be the auxiliary data fields of the AC-3 frames as described above. The reference site processor 122 (FIG. 1) uses the extracted audience measurement data to generate a program lineup (block 904). In particular, because the reference site 108 (FIG. 1) can use its multiple decoders 116, 118 and 120 to receive and process multiple audio/video bit streams simultaneously, the reference site processor 122 (FIG. 1) can simultaneously detect and identify, using the inserted audience measurement data, a plurality of broadcast programs available for consumption. The reference site 122 (FIG. 1) may then transmit the generated program lineup information to the collection site (block 906), which in this case is the central processing facility 124 (FIG. 1).

At the consumption site 110 (FIG. 1), the site unit 132 is configured to extract the inserted audience measurement data from the signal 136 (block 908), which, in one example, is an S/PDIF signal containing compressed audio data compliant with the AC-3 standard. In that case, the inserted audience measurement data is located in the auxiliary data fields of the AC-3 data frames and the site unit 132 (FIG. 1) is configured to identify the auxiliary data fields and to extract information therefrom. The site unit 132 (FIG. 1) is also coupled to a people meter and/or other devices that enable the site unit 132 (FIG. 1) to generate demographic information (block 910). For example, the site unit 132 (FIG. 1) may be configured to detect the identities of the person or persons currently consuming an audio/video program via the output unit 128. In any event, the site unit 132 (FIG. 1) transmits the viewing behavior information (i.e., the audience measurement data, demographic information, etc.) to the collection site (block 912) (i.e., the central processing facility 124 (FIG. 1)).

The collection site or central processing facility 124 (FIG. 1) then compares the viewing behavior information received from the consumption site 110 (FIG. 1) to the program lineup information received from the reference site 108 (FIG. 1) (block 914). By matching the viewing behavior information to portions of the program lineup information, the collection site or central processing facility 124 (FIG. 1) may determine the time and manner in which audio/video programs were consumed at the consumption site 110 (FIG. 1) and/or other consumption sites (not shown) and by whom those audio/video programs were consumed. The matching information generated at block 914 may then be used by the central processing facility 124 (FIG. 1) to generate ratings information (block 916).

In cases where the data generator 304 (FIG. 3) has provided non-audience measurement data (e.g., interactive data) to the data inserter 302 (FIG. 3), the decoder 130 (FIG. 3) and/or site unit 132 (FIG. 3) may extract from the auxiliary data fields of the AC-3 frames and process that non-audience measurement data. For example, the site unit 132 (FIG. 1) may include or be coupled to a web server (not shown) that enables activation of URLs and/or other interactive data. In some cases, the non-audience measurement data may be appropriately transcoded and conveyed via one or more wireless communication links to a portable devices such as, for example, a cellular phone, personal data assistant and/or a computer.

Figure 10:
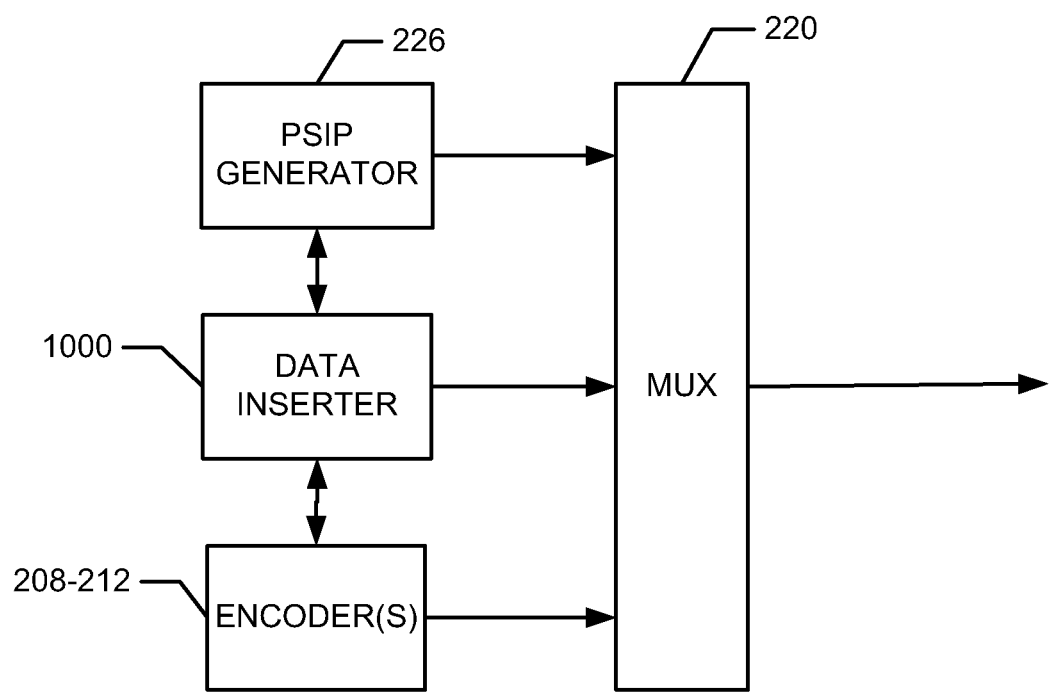
FIG. 10 is a block diagram of another manner in which a data inserter may be configured to insert audience measurement data in a compressed audio/video content bit stream.

Although the example data inserter 302 is depicted in FIG. 3 as being serially interposed between the multiplexer 220 and the modulator 222, other configurations may be used instead to achieve results identical or similar to those described above. FIG. 10 is a block diagram of another manner in which a data inserter 1000 may be configured to insert audience measurement data in a compressed audio/video content or program bit stream. As depicted in FIG. 10, the data inserter 1000 is communicatively coupled to the PSIP generator 226, one or more of the encoders 208, 210 and 212 and the multiplexer 220. In this configuration, the data inserter 1000 does not require a demultiplexer (e.g., the demultiplexer 400 of FIG. 4) or a multiplexer (e.g. the multiplexer 410 of FIG. 4). Still other configurations are possible.

For example, the data inserter 1000 may be integrated with the PSIP generator 226 and/or one or more of the encoders 208-212.

While the data insertion apparatus and methods described above have been described with reference to specific examples, the apparatus and methods may be implemented in different manners to achieve identical or similar results. More specifically, although example methods and apparatus may reorganize (e.g., temporally pack) compressed audio data within AC-3 compliant data frames to expand the number of bits available for AC-3 frame auxiliary data fields, into which data may be inserted, other insertion techniques may be used instead. For example, audience measurement data and/or other data may be inserted in private descriptors such as, for example, the ATSC private descriptor, the MPEG-2 metadata descriptor and/or the MPEG-2 private descriptor in Program System Information (PSI) tables (e.g., the program loop that is present in a program map table (PMT) section). Alternatively or additionally, the audience measurement data and/or other data may be inserted in PES packets, Event Information Tables (EITs), A-90 data packets and/or null or padding packets to achieve identical or similar results.

As described above, the data inserter 302 of FIG. 3 may be configured to insert information (e.g., audience measurement data, non-audience measurement data, etc.) into temporally packed frames of compressed audio data. In particular, the data inserter 302 (FIG. 3) may temporally pack data packets containing audio and/or video content to facilitate the insertion of audience measurement data and the like into data space that would otherwise be used for skip bytes, auxiliary data bytes, and/or other data space not used to convey audio and/or video content data. However, as described in greater detail below, the data inserter 302 of FIG. 3 may additionally or alternatively be configured to insert or embed watermark information in data packets containing compressed audio and/or video content information. More specifically, the data inserter 302 of FIG. 3 may be configured to embed watermarks in compressed digital data streams (i.e., without prior decompression of the compressed digital data streams), thereby eliminating the need to subject compressed digital data streams to additional decompression/compression cycles, which may significantly degrade the quality of the audio and/or video content data.

Prior to broadcast, for example, the watermarking methods and apparatus disclosed herein may be used to unpack the modified discrete cosine transform (MDCT) coefficient sets associated with a compressed digital data stream formatted by a digital audio compression technology such as the AC-3 compression standard. The mantissas of the unpacked MDCT coefficient sets may be modified to embed watermarks that imperceptibly augment the compressed digital data stream. Upon receipt of the compressed digital data stream, a receiving device (e.g., a set top box at a media consumption site) may extract the embedded watermark information. The extracted watermark information may be used to identify the media sources and/or programs (e.g., broadcast stations) associated with media currently being consumed (e.g., viewed, listened to, etc.) at a media consumption site. In turn, the source and program identification information may be used in known manners to generate ratings information and/or any other information that may be used to assess the viewing behaviors of individual households and/or groups of households.

Figure 11:
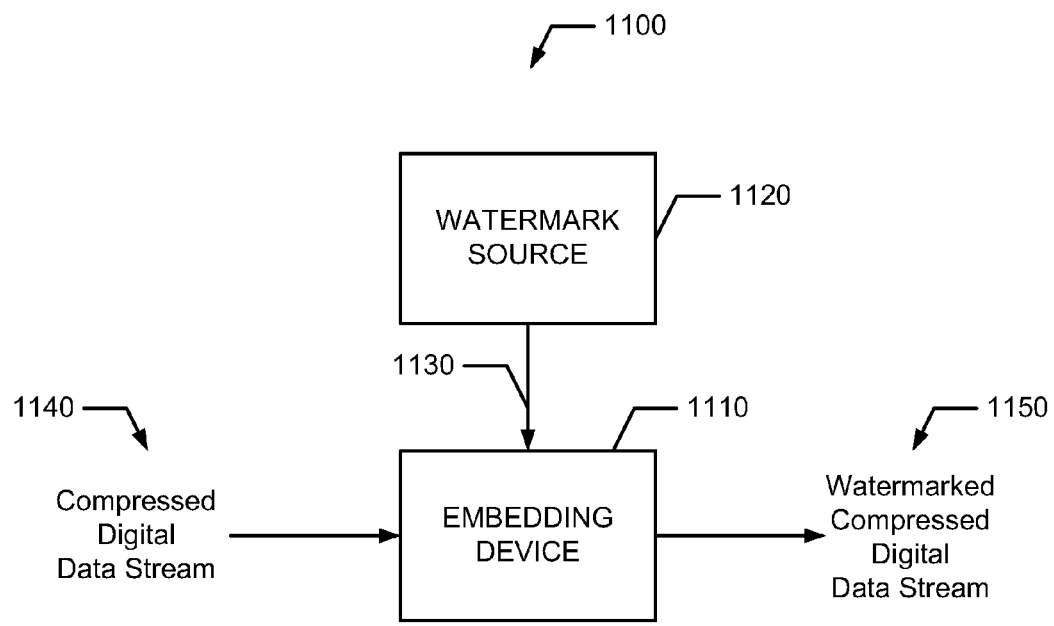
FIG. 11 is a block diagram representation of an example watermark embedding system.

FIG. 11 depicts an example watermarking system 1100 that may be used to implement the data inserter 302 of FIG. 3. The watermarking system 1100 may be used instead of or in addition to the data insertion apparatus and methods described in connection with FIGS. 4-8 above. Thus, in some embodiments, the data inserter 302 may be configured to insert audience measurement data into non-content carrying data spaces within temporally packed frames and may also use the watermarking system 1100 to embed watermark data in the data packets (within the temporally packed frames) carrying compressed audio and/or video content data.

Now turning in detail to FIG. 11, the example watermark embedding system 1100 includes an embedding device 1110 and a watermark source 1120. The embedding device 1110 is configured to insert watermark data 1130 from the watermark source 1120 into a compressed digital data stream 1140. The compressed digital data stream 1140 may be the multi-program data stream provided by, for example, the multiplexer 220 (FIG. 3) and, thus, may include data compressed according to audio compression standards such as the AC-3 compression standard and/or the MPEG-AAC compression standard. The source of the compressed digital data stream 1140 may sample an audio signal at a sampling rate of, for example, 48 kilohertz (kHz) to form audio blocks as described below. With the AC-3 standard, two different block sizes (i.e., short and long blocks) are typically used depending on the dynamic characteristics of the audio signal. For example, short blocks may be used to minimize pre-echo for transient segments of the audio signal and long blocks may be used to achieve high compression gain for non-transient segments of the audio signal. In accordance with the AC-3 compression standard, for example, a short block contains 256 samples and a long block contains 512 samples. In accordance with the MPEG-AAC compression standard as another example, audio blocks may range in size from 128 to 2048 samples.

Typically, audio compression techniques such as those based on the AC-3 compression standard use overlapped audio blocks and the Modified Discrete Cosine Transform (MDCT) algorithm to convert an audio signal into a compressed digital data stream (e.g., the compressed digital data stream 240 of FIG. 2). As is known, audio compression techniques decrease the number of bits required to represent an original audio signal. In accordance with the AC-3 compression standard, for example, the MDCT algorithm generates MDCT coefficient sets based on audio blocks, each of which contains 256 old samples and 256 new samples (i.e., a 512-sample time domain audio block).

Figure 12:
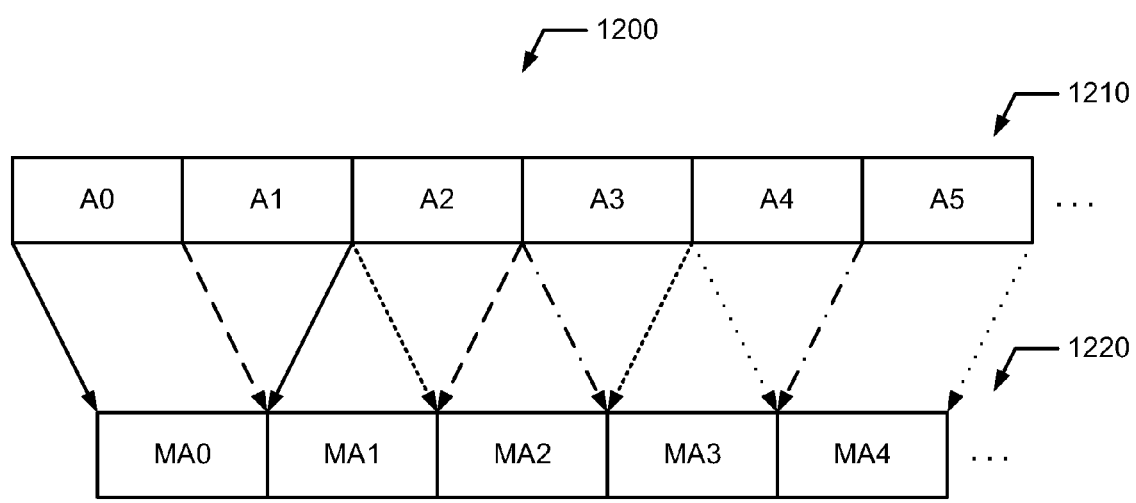
FIG. 12 is a block diagram representation of an example uncompressed digital data stream associated with the example watermark embedding system of FIG. 11.

In the example of FIG. 12, an uncompressed digital data stream 1200 includes a plurality of 256-sample audio blocks 1210, generally shown as A0, A1, A2, A3, A4, and A5. The MDCT algorithm processes the audio blocks 1210 to generate MDCT coefficient sets 1220, generally shown as MA0, MA1, MA2, MA3, MA4, and MA5. In particular, a sequence of 512-sample audio blocks may be generated by concatenating samples from adjacent audio blocks. An MDCT transform may be performed on the sequence of 512-sample audio blocks to generate MDCT coefficient sets with each MDCT coefficient set having 256 MDCT coefficients. For example, the MDCT algorithm may process the audio blocks A0 and A1 to generate the MDCT coefficient set MA0. The audio block A0 provides 256 old samples that are concatenated with 256 new samples provided by the audio block A1 to generate the MDCT coefficient set MA0, which is composed of 256 MDCT coefficients. In particular, the audio blocks A0 and A1 may be concatenated to generate a 512-sample audio block A01. The MDCT algorithm transforms the audio block A01 to generate the MDCT coefficient set MA0. Likewise, the audio blocks A1 and A2 may be processed to generate the MDCT coefficient set MA1. In that case, the audio block A1 provides 256 old samples that are concatenated with 256 new samples provided by the audio block A2 to generate a 512- sample audio block A12. The MDCT algorithm transforms the audio block A12 to generate the MDCT coefficient set MA1, which is composed of 256 MDCT coefficients. As a result, the audio block A1 serves as an overlapping audio block that is used to generate the MDCT coefficient sets MA0 and MA1. In a similar manner, the MDCT algorithm may process the audio blocks A2 and A3 to generate the MDCT coefficient set MA2, the audio blocks A3 and A4 to generate the MDCT coefficient set MA3, and the audio blocks A4 and A5 to generate the MDCT coefficient set MA4. Accordingly, the audio block A2 serves as an overlapping audio block to generate the MDCT coefficient sets MA1 and MA2, the audio block A3 serves as an overlapping audio block to generate the MDCT coefficient sets MA2 and MA3, and the audio block A4 serves as an overlapping audio block to generate the MDCT coefficient sets MA3 and MA4. Together, the MDCT coefficient sets 1220 form the compressed digital data stream 1140.

As described in detail below, the embedding device 1110 of FIG. 11 may embed or insert the watermark data 1130 into the compressed digital data stream 1140. The watermark data 1130 may be used, for example, to uniquely identify broadcasters and/or programs so that media consumption information (e.g., viewing information) and/or ratings information may be produced. Thus, the embedding device 1110 produces a watermarked compressed digital data stream 1150 for transmission.

Figures 13, 15:
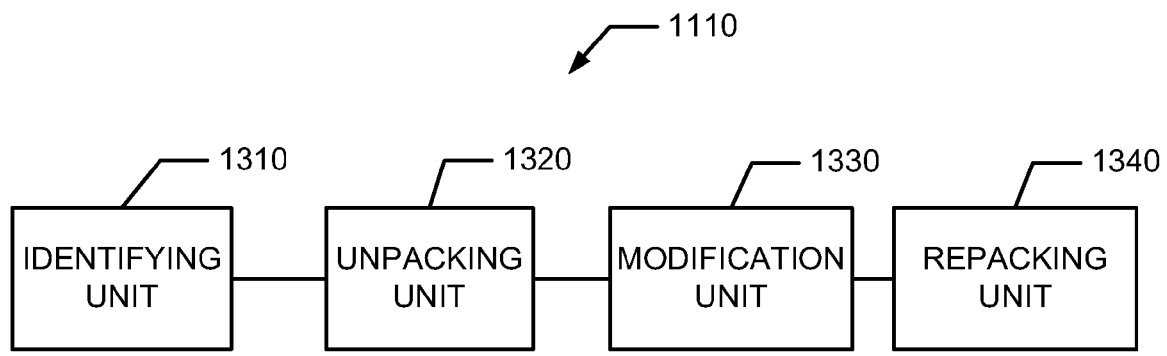
FIG. 13 is a block diagram representation of an example embedding device that may be used to implement the example watermark embedding system of FIG. 11.
FIG. 15 depicts an example quantization look-up table that may be used to implement the example watermark embedding system of FIG. 11.

FIG. 13 is a block diagram depicting one manner in which the embedding device 1110 of FIG. 11 may be implemented. In the example of FIG. 13, the embedding device 1110 includes an identifying unit 1310, an unpacking unit 1320, a modification unit 1330, and a repacking unit 1340. In should be recognized that in implementations where the data inserter 302 (FIG. 3) is configured to both temporally pack or reorganize data within frames of compressed audio and/or video data and insert audience measurement information in the contiguous data spaces created thereby as well as insert watermark data in the compressed data packets containing audio and/or video content, one or more of the blocks shown in FIG. 13 may be integrated with one or more of the blocks shown in FIGS. 4 and 5. For example, the operations of the identifying unit 1310 and the demultiplexer 400 (FIG. 4) may be integrated, the operations of the unpacking unit 1320 and the program information extractor 402 (FIG. 4) may be integrated, the operations of the modification unit 1330 and the data insertion unit 406 (FIG. 4) may be integrated, etc.

It should also be noted that while the operation of the embedding device 1110 is described below in accordance with the AC-3 compression standard, the embedding device 1110 may be implemented to operate with additional or other compression standards such as, for example, the MPEG-AAC or the MPEG Layer II compression standards. Further, the operation of the example embedding device 1110 is described in conjunction with FIG. 14. In particular, the identifying unit 1310 is configured to identify one or more frames 1410 associated with the compressed digital data stream 1140, generally shown as Frame A and Frame B. For example, the compressed digital data stream 1140 may be a digital data stream compressed in accordance with the AC-3 standard (hereinafter "AC-3 data stream"). While the AC-3 data stream 1140 may include multiple channels, in the interest of clarity, the following example describes the AC-3 data stream 1140 as including only one channel. In the AC-3 data stream 1140, each of the frames 1410 includes a number of MDCT coefficient sets 1420. In accordance with the AC-3 compression standard, for example, each of the frames 1410 includes six MDCT coefficient sets (i.e., six "audblk"). In particular, Frame A includes the MDCT coefficient sets MA1, MA2, MA3, MA4, and MA5 while Frame B includes the MDCT coefficient sets MB0, MB1, MB2, MB3, MB4, and MB5.

The identifying unit 1310 is also configured to identify header information associated with each of the frames 1410 such as the number of channels associated with the AC-3 data stream 1140. While the example AC-3 data stream 1140 includes only one channel as noted above, an example compressed digital data stream having multiple channels is described below in conjunction with FIGS. 16 and 17.

The unpacking unit 1320 is configured to unpack the MDCT coefficient sets 1420 to determine compression information such as, for example, the parameters of the original compression process (i.e., the manner in which an audio compression technique compressed an audio signal to form the compressed digital data stream 1140). For example, the unpacking unit 1320 may determine how many bits are used to represent each of the MDCT coefficients within the MDCT coefficient sets 1420. Thus, in the case where the original audio sample (e.g., the audio blocks 1210 of FIG. 12) are each represented using sixteen bits, the MDCT coefficients within each of the MDCT coefficient sets 1420 may be represented using less than sixteen bits. More generally, compression parameters may limit changes to the AC-3 data stream 1140 to ensure that the AC-3 data stream 1140 will provide high quality content. Thus, the embedding device 1110 embeds or inserts the watermark data 1130 in the AC-3 data stream 1140 based on (e.g., in a manner consistent with) the compression information identified by the unpacking unit 1320.

As described in detail in the AC-3 compression standard, compression information also includes a mantissa and an exponent associated with each MDCT coefficient of the MDCT coefficient sets 1420. Specifically, the presence of audio energy $E_k$ either at a particular frequency k (e.g., a tone) or spread across a band of frequencies proximate to the particular frequency k (e.g., a noise) creates a masking effect. That is, the human ear is unable to perceive a change in energy $\Delta E_k$ below an energy threshold in a spectral region either at a frequency k or spread across the band of frequencies proximate to the frequency k. As a result, an MCDT coefficient $m_k$ associated with the frequency k may be quantized with a step size related to $\Delta E_k$. For the AC-3 data stream 240, each MDCT coefficient of the MDCT coefficient sets 520 is unpacked as a mantissa $M_k$ and an exponent $X_k$ such that $m_k = M_k \cdot 2^{-X_k}$. The number of bits used to represent the mantissa $M_k$ of each MDCT coefficient of the MDCT coefficient sets 520 may be identified based on known quantization look-up tables published in the AC-3 compression standard (e.g., the quantization look-up table 1500 of FIG. 15). In the example of FIG. 15, the quantization look-up table 1500 provides mantissa codes, mantissa bit patterns, and mantissa values for MDCT coefficients represented by a four-bit number. As described in detail below, the mantissa $M_k$ may be used to represent a modified value of an MDCT coefficient in the MDCT coefficient sets 520 after watermarks have been inserted into the AC-3 data stream 240.

The modification unit 1330 is configured to perform an inverse transform of each of the MDCT coefficient sets 1420 to generate inverse transformed time-domain audio blocks 1430, generally shown as TA0', TA3'', TA4', TA4'', TA5', TA5'', TB0', TB0'', TB1', TB1'', and TB5' (i.e., TA0'' through TA3' and TB2' through TB4'' are not shown). In particular, the modification unit 1330 generates an old inverse transformed time-domain audio block (which is represented as a prime block) and a new inverse transformed time-domain audio block (which is represented as a double-prime block) associated with each of the 256-sample compressed time-domain audio blocks that were concatenated to form the MDCT coefficient sets 1420 of the AC-3 data stream 1140. For example, the modification unit 1330 performs an inverse transform on the MDCT coefficient set MA5 to generate TA4" and TA5', the MDCT coefficient set MB0 to generate TA5" and TB0', and the MDCT coefficient set MB1 to generate TB0" and TB1'. In this manner, the modification unit 1330 generates the reconstructed time-domain audio blocks 1440 by reconstructing compressed time-domain audio blocks of the AC-3 data stream 1140. To generate the reconstructed time-domain audio blocks 1440, the modification unit 1330 may add inverse transformed time-domain audio blocks based on, for example, the known Princen-Bradley time domain alias cancellation (TDAC) technique as described in Princen et al., *Analysis/Synthesis Filter Bank Design Based on Time Domain Aliasing Cancellation*, Institute of Electrical and Electronics Engineers Transactions, 34 Acousting, Speech and Signal Processing 1153, 1153-1161 (1996). For example, the modification unit 1330 may reconstruct the compressed time-domain audio block TA5 (i.e., TA5R) by adding the prime audio block TA5' and the double-prime audio block TA5" using the Princen-Bradley TDAC technique. Likewise, the modification unit 1330 may reconstruct the compressed time-domain audio block TB0 (i.e., TB0R) by adding the prime audio block TB0' and the double-prime audio block TB0" using the Princen-Bradley TDAC technique. Thus, the compressed time-domain audio blocks of the AC-3 data stream 1140 are reconstructed (i.e., the reconstructed time-domain audio blocks 1440) without having to perform a decompression operation so that the watermark data 1130 may be embedded or inserted into the AC-3 data stream 1140 as described below.

The modification unit 1330 is configured to insert the watermark data 1130 into the reconstructed time-domain audio blocks 1440 to generate watermarked time-domain audio blocks 1450, generally shown as TA0W, TA4W, TA5W, TB0W, TB1W, and TB2W. To insert the watermark data 1130, the modification unit 1330 generates a modifiable time-domain audio block by concatenating two adjacent reconstructed time-domain audio blocks to create a 512-sample audio block. For example, the modification unit 1330 may concatenate the reconstructed time-domain audio blocks TA5R and TB0R (i.e., each is a 256-sample audio block) to form a 512-sample audio block. In this manner, the modification unit 1330 inserts the watermark data 1130 into the 512-sample audio block formed by the reconstructed time-domain audio blocks TA5R and TB0R to generate the watermarked time-domain audio blocks TA5W and TB0W. Encoding processes such as those described in U.S. Pat. Nos. 6,272,176, 6,504,870, and 6,621,881 may be used to insert or embed the watermark data 1130 into the reconstructed time-domain audio blocks 1140. The disclosures of U.S. Pat. Nos. 6,272,176, 6,504,870, and 6,621,881 are hereby incorporated herein in their entireties.

In the encoding methods and apparatus described in U.S. Pat. Nos. 6,272,176, 6,504,870, and 6,621,881, watermarks may be inserted into a 512 sample audio block. For example, each 512 sample audio block carries one bit of embedded or inserted data of the watermark data 1130. A pair of spectral frequency components with indexes $f_1$ and $f_2$ may be modified to insert the watermark data 1130. To represent a binary "1", for example, data bits associated with the watermark data 1130 may be added so that the power at the first spectral frequency associated with the index $f_1$ becomes a spectral power maximum within a frequency neighborhood (e.g., $f_1-2, f_1-1, f_1, f_1+1,$ and $f_1+2$). At the same time, the power at the second spectral frequency associated with the index $f_2$ is attenuated by the watermark data 1130 so that the power at the second spectral frequency associated with the index $f_2$ becomes a spectral power minimum within a frequency neighborhood (e.g., $f_2-2, f_2-1, f_2, f_2+1,$ and $f_2+2$). On the other hand, to represent a binary "0," the power at the first spectral frequency associated with the index $f_1$ is attenuated to be a local spectral power minimum while the power at the second spectral frequency associated with the index $f_2$ becomes a local spectral power maximum. The power at the first and second spectral frequencies associated with indexes $f_1$ and $f_2$ may be varied from audio block to audio block in a pseudo-random manner to prevent the watermark data 1130 from generating an audible tone.

In addition, a sequence of audio blocks containing a unique pattern of binary 1s and 0s is embedded within the audio blocks to provide a synchronization marker. The synchronization marker is followed by pseudo-noise (PN) sequences of bit patterns representing the actual data of the compressed digital data stream 1140. Each five-bit data group is represented by a fifteen-bit PN sequence. The amplitude of the watermark data 1130 required for each audio block may be controlled by psycho-acoustic marking models to ensure perceptual inaudibility of the watermark data 1130. Even if some of the audio blocks are not coded (i.e., not watermarked) due to the masking constraints, watermark data may still be recovered because of the redundancy created by the PN sequence(s).

Based on the watermarked time-domain audio blocks 1450, the modification unit 1330 generates watermarked MDCT coefficient sets 1460, generally shown as MA0W, MA4W, MA5W, MB0W, and MB5W. Following the example described above, the modification unit 1330 generates the watermarked MDCT coefficient set MA5W based on the watermarked time-domain audio blocks TA5W and TB0W. Specifically, the modification unit 1330 concatenates the watermarked time-domain audio blocks TA5W and TB0W into a 512-sample audio block and converts the 512-sample audio block into the watermarked MDCT coefficient set MA5W, which may be used to substitute or replace the original MDCT coefficient set MA5.

The difference between the MDCT coefficient sets 1420 and the watermarked MDCT coefficient sets 1460 represents a change in the AC-3 data stream 1140 as a result of embedding or inserting the watermark data 1130. As described in conjunction with FIG. 15, for example, the modification unit 1330 may replace the MDCT coefficient set MA5 with its corresponding watermarked MDCT coefficient set MA5W. In general, the known quantization look-up tables (e.g., look-up table 1500 of FIG. 15) may be used to determine new mantissa codes associated with MDCT coefficients of the watermarked MDCT coefficient sets 1460 to replace the old mantissa codes associated with the MDCT coefficients of the MDCT coefficient sets 1420. Thus, the new mantissa codes represent the change in the AC-3 data stream 1140 as a result of embedding or inserting the watermark data 1130.

In particular, the example quantization look-up table 1500 includes mantissa codes, mantissa bit patterns, and mantissa values for a fifteen-level quantization of an example mantissa $M_k$ in the range of −0.9333 to +0.9333. While the quantization look-up table 1500 provides mantissa information associated with MDCT coefficients that are represented using four bits, the AC-3 compression standard provides quantization look-up tables associated with other suitable numbers of bits per MDCT coefficient. To illustrate one manner in which the modification unit 1330 may modify a particular MDCT coefficient $m_k$ with a mantissa code $M_k$ contained in the MDCT coefficient set MA5, assume the original mantissa value is −0.2666 (i.e., −4/15). Using the quantization look-up table 1500, the mantissa bit pattern corresponding to the particular MDCT coefficient $m_k$ in the MDCT coefficient set MA5 is determined to be 0101 (i.e., mantissa code of 5). The watermarked MDCT coefficient set MA5W includes a watermarked MDCT coefficient $wm_k$ with a mantissa code $WM_k$ (i.e., a desired new mantissa code). Further, assume the new mantissa value of the corresponding watermarked MDCT coefficient $wm_k$ of the watermarked MDCT coefficient set MA5W is −0.4300, which lies between the mantissa codes of 3 and 4. In other words, embedding the watermark data 1130, in this example, results in a difference of −0.1667 between the original mantissa value of −0.2666 and the watermarked mantissa value of −0.4300.

To embed or insert the watermark data 1130 in the AC-3 data stream 1140, the modification unit 1330 may substitute the watermarked MDCT coefficient set MA5W for the MDCT coefficient set MA5 by modifying the MDCT coefficients in the MDCT coefficient set MA5. In this case, either mantissa code 3 or mantissa code 4 may replace the mantissa code $M_k$ of 5 associated with the MDCT coefficient $m_k$ (i.e., an MDCT coefficient in the MDCT coefficient set MA5) because the watermarked mantissa code $WM_k$ associated with the watermarked MDCT coefficient $wm_k$ (i.e., an MDCT coefficient in the watermarked MDCT coefficient set MA5W) lies between the mantissa codes of 3 and 4 (i.e., the mantissa value corresponding to the watermarked MDCT coefficient $wm_k$ is −0.4300). The mantissa value corresponding to the mantissa code 3 is −0.5333 (i.e., −8/15) and the mantissa value corresponding to the mantissa code 4 is −0.4 (i.e., −6/15). In this manner, the modification unit 1330 selects the mantissa code 4 (i.e., 0100) instead of the mantissa code 3 to replace the mantissa code $M_k$ of 5 associated with the MDCT coefficient $m_k$ because the mantissa value −0.4 corresponding to the mantissa code 4 is closer to the mantissa value −0.4300 corresponding to the watermarked mantissa code $WM_k$ associated with the watermarked MDCT coefficient $wm_k$ than the mantissa value −0.5333 corresponding to the mantissa code 3. As a result, the new mantissa bit pattern of 0100, which now corresponds to the watermarked mantissa code $WM_k$ of the watermarked MDCT coefficient $wm_k$, replaces the original mantissa bit pattern of 0101, which corresponds to the mantissa code $M_k$ of 5 associated with the MDCT coefficient $m_k$. However, if the new mantissa value is outside the quantization range of mantissa values (i.e., greater than 0.9333 or less than −0.9333), either the positive limit of 14 or the negative limit of 0 is selected as the new mantissa code. Likewise, each of the MDCT coefficients in the MDCT coefficient set MA5 may be modified by a corresponding watermarked MDCT coefficient in the watermarked coefficient set MA5W in the manner described above. While the mantissa code associated with each MDCT coefficient of an MDCT coefficient set may be modified as described above, the exponents associated with the MDCT coefficients remain constant.

The repacking unit 1340 is configured to repack the watermarked MDCT coefficient sets 1460 associated with each frame of the AC-3 data stream 1140 for transmission. In particular, the repacking unit 1340 identifies the position of each MDCT coefficient set within a frame of the AC-3 data stream 1140 so that the corresponding watermarked MDCT coefficient set may replace the MDCT coefficient set. To rebuild a watermarked version of Frame A, for example, the repacking unit 1340 may identify the position of the MDCT coefficient sets MA0 to MA5 to substitute the corresponding watermarked MDCT coefficient sets MA0W to MA5W for the MDCT coefficient sets MA0 to MA5. Using the unpacking, modifying, and repacking processes described herein, the AC-3 data stream 1140 remains a compressed digital data stream while the watermark data 1130 is embedded or inserted in the AC-3 data stream 1140. As a result, the embedding device 1110 inserts or embeds the watermark data 230 into the AC-3 data stream 240 without additional decompression/compression cycles that may degrade the quality of the content in the AC-3 data stream 1140.

Figure 14:
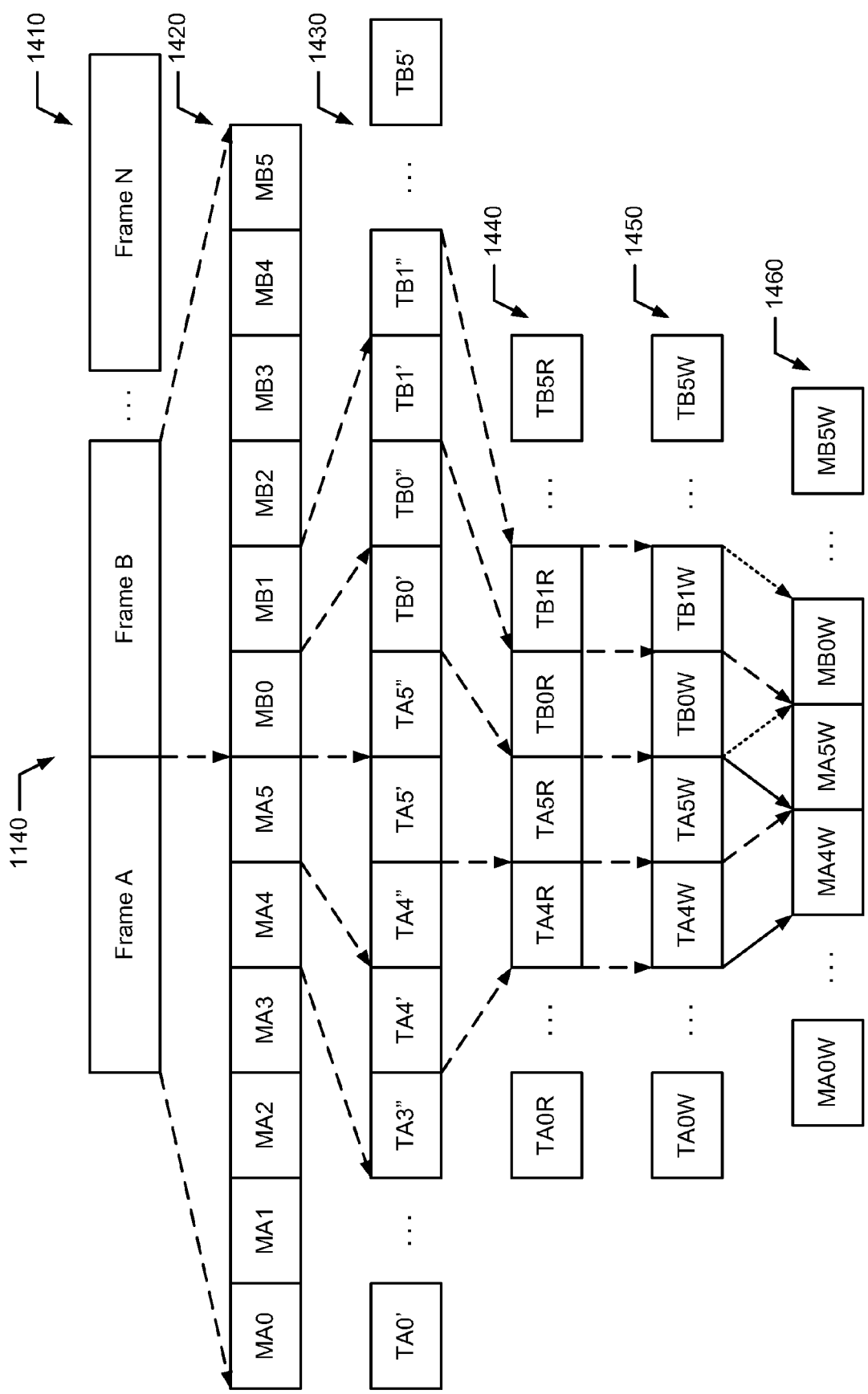
FIG. 14 depicts an example compressed digital data stream associated with the example embedding device of FIG. 13.
Figure 16:
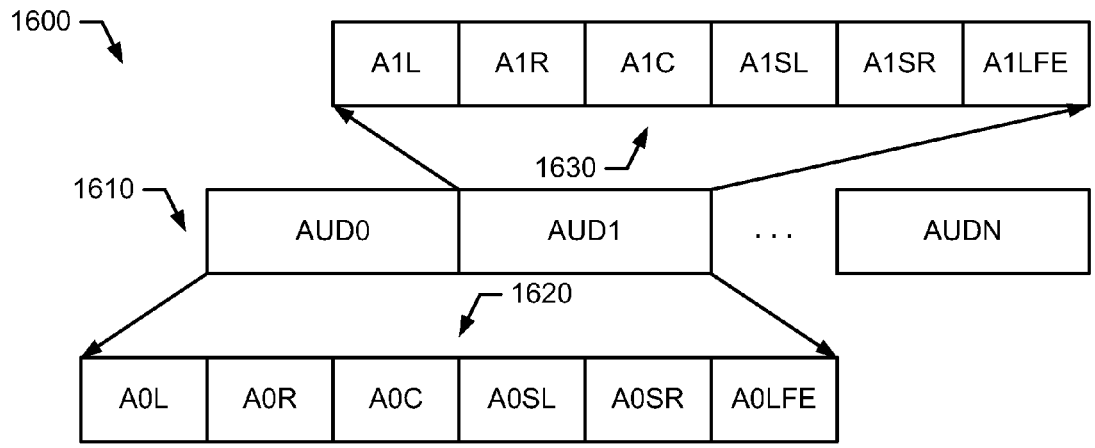
FIG. 16 depicts another example uncompressed digital data stream that may be processed using the example watermark embedding system of FIG. 11.
Figure 17:
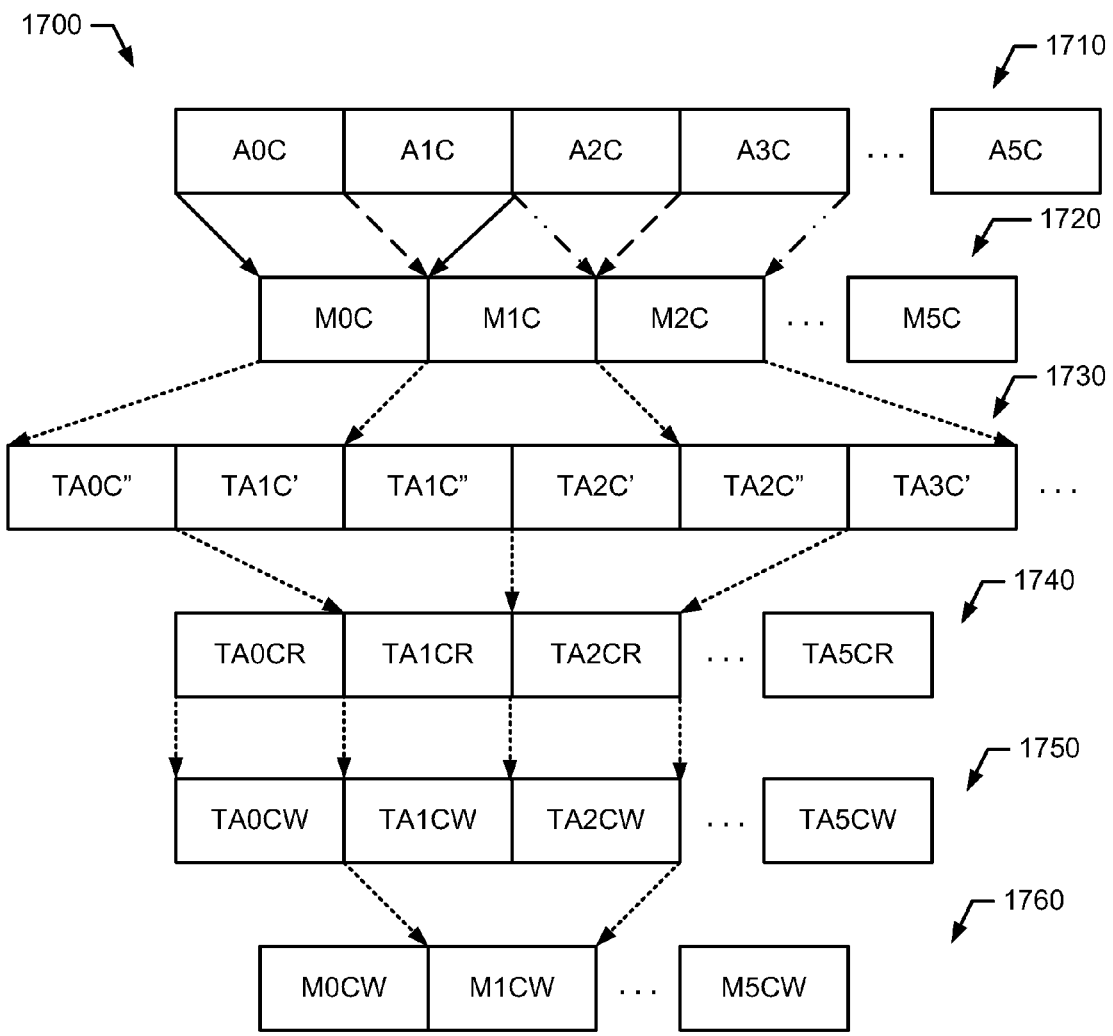
FIG. 17 is depicts an example compressed digital data stream associated with the example uncompressed digital data stream of FIG. 17.

While the AC-3 data stream 1140 is described in conjunction with FIG. 14 to include a single channel for simplicity, the methods and apparatus disclosed herein may be applied to compressed digital data streams having audio blocks associated with multiple channels such as 5.1 channels as described below (i.e., five full-bandwidth channels). In the example of FIG. 16, an uncompressed digital data stream 1600 may include a plurality of audio block sets 1610. Each of the audio block sets 1610 may include audio blocks associated with multiple channels 1620 and 1630 including, for example, a front left channel, a front right channel, a center channel, a surround left channel, a surround right channel, and a low-frequency effect (LFE) channel (e.g., a sub-woofer channel). For example, the audio block set AUD0 includes an audio block A0L associated with the front left channel, an audio block A0R associated with the front right channel, an audio block A0C associated with the center channel, an audio block A0SL associated with the surround left channel, an audio block A0SR associated with the surround right channel, and an audio block A0LFE associated with the LFE channel. In another example, the audio block set AUD1 includes an audio block A1L associated with the front left channel, an audio block A1R associated with the front right channel, an audio block A1C associated with the center channel, an audio block A1SL associated with the surround left channel, an audio block A1SR associated with the surround right channel, and an audio block A1LFE associated with the LFE channel.

Each of the audio blocks associated with a particular channel in the audio block sets 1610 may be processed in a similar manner as described above in conjunction with FIGS. 14 and 15. For example, the audio blocks associated with the center channel 1710 of FIG. 17, generally shown as A0C, A1C, A2C, and A3C, may be compressed to generate the MDCT coefficient sets 1720 associated with a compressed digital data stream 1700. As noted above, each of the MDCT coefficient sets 1720 may be derived from a 512-sample audio block formed by concatenating an old 256-sample audio block and a new 256-sample audio block. In particular, the MDCT algorithm may process the audio blocks 1710 (e.g., A0C through A5C) to generate the MDCT coefficient sets (e.g., M0C through M5C).

Based on the MDCT coefficient sets 1720 of the compressed digital data stream 1700, the identifying unit 1310 identifies a plurality of frames and header information associated with each of the frames as described above. The header information includes compression information associated with the compressed digital data stream 1700. For each of the frames, the unpacking unit 1320 unpacks the MDCT coefficient sets 1720 to determine the compression information associated with the MDCT coefficient sets 1720. For example, the unpacking unit 1320 may identify the number of bits used by the original compression process to represent the mantissa of each MDCT coefficient in each of the MDCT coefficient sets 1720. Such compression information may be used to embed the watermark data 1130 as described above in conjunction with FIG. 15. The modification unit 1330 then generates inverse transformed audio blocks 1730, generally shown as TA0C", TA1C', TA1C", TA2C', TA2C", and TA3C'. In particular, the inverse transformed audio blocks 1730 include old inverse transformed time-domain audio blocks (which are represented as prime blocks) and new inverse transformed time-domain audio blocks (which are represented as double-prime blocks). By adding the corresponding prime blocks and double-prime blocks based on, for example, the Princen-Bradley TDAC technique, compressed time-domain audio blocks of the compressed digital data stream 1700 may be reconstructed (i.e., the reconstructed time-domain audio blocks 1740). For example, the modification unit 1330 may add the inverse transformed audio blocks TA1C' and TA1C" to reconstruct the compressed time-domain audio block TA1C (i.e., TA1CR). Likewise, the modification unit 1330 may add the inverse transformed audio blocks TA2C' and TA2C" to reconstruct the compressed time-domain audio block TA2C (i.e., TA2CR). To insert the watermark data 1130, the modification unit 1330 first concatenates two adjacent reconstructed time-domain audio blocks to create a 512-sample audio block (i.e., a modifiable time-domain audio block). For example, the modification unit 1330 may concatenate the reconstructed time-domain audio blocks TA1CR and TA2CR, each of which is a 256-sample short block to form a 512-sample audio block. Accordingly, the modification unit 1330 inserts the watermark 1130 into the 512-sample audio block formed by the reconstructed time-domain audio blocks TA1CR and TA2CR to generate the watermarked time-domain audio blocks TA1CW and TA2CW.

Based on the watermarked time-domain audio blocks 1750, the modification unit 1330 may generate the watermarked MDCT coefficient sets 1760. For example, the modification unit 1330 may concatenate the watermarked time-domain audio blocks TA1CW and TA2CW to generate the watermarked MDCT coefficient set M1CW. Accordingly, the modification unit 1330 modifies the MDCT coefficient sets 1720 by replacing each of the MDCT coefficient sets 1720 with a corresponding one of the watermarked MDCT coefficient sets 1760. For example, the modification unit 1330 may substitute the watermarked MDCT coefficient set M1CW for the original MDCT coefficient set M1C. In particular, the modification unit 1330 may substitute the MDCT coefficients in the watermarked coefficient set M1CW for the MDCT coefficients in the original MDCT coefficient set M1C. The embedding device 1140 may repeat the process described above for audio blocks associated with each channel to insert the watermark data 1130 into the compressed digital data stream 1700.

Figure 18:
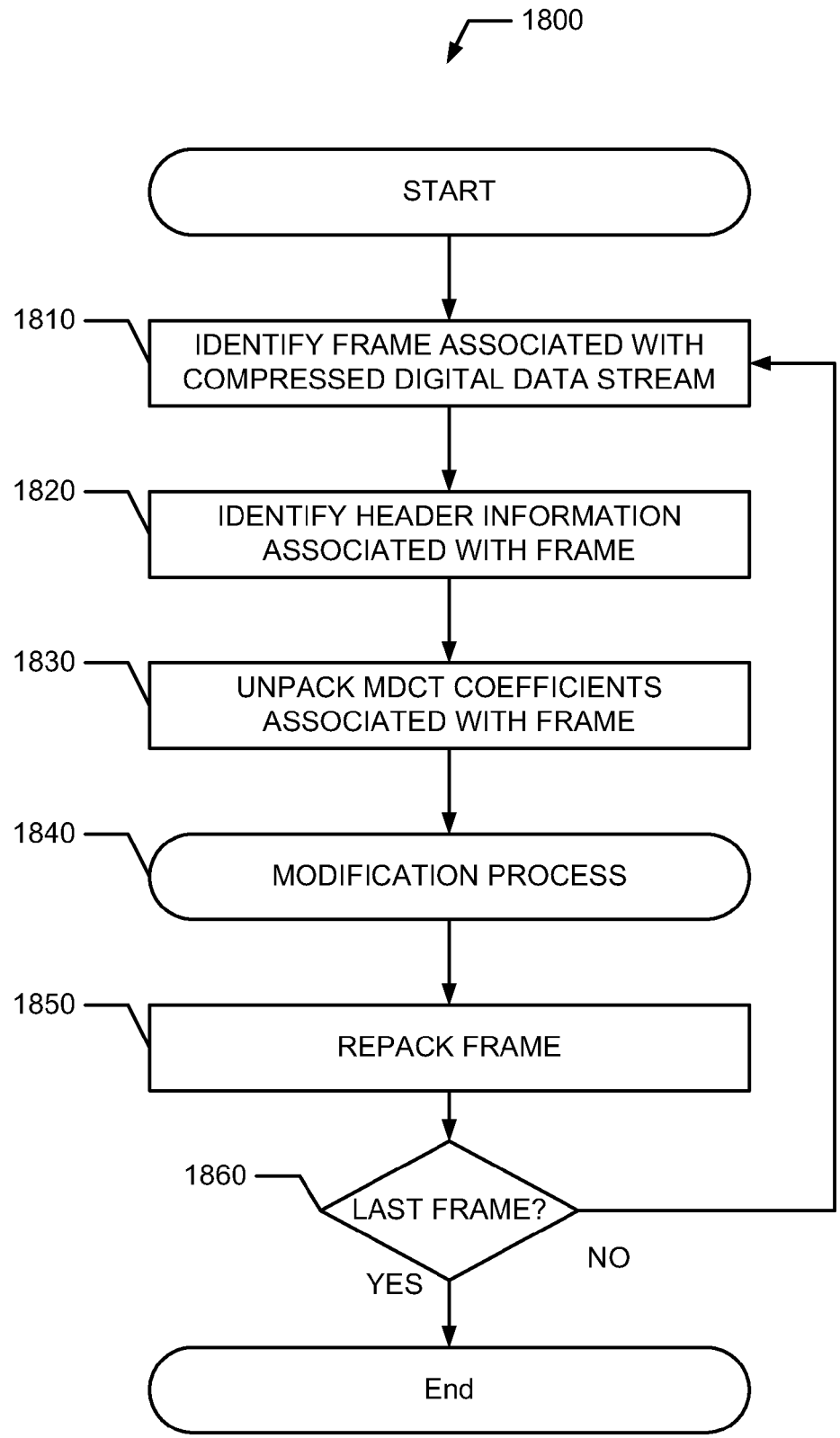
FIG. 18 is a flow diagram depicting one manner in which the example watermark embedding system of FIG. 11 may be configured to embed watermarks.

FIG. 18 is a flow diagram depicting one manner in which the example watermark embedding system of FIG. 11 may be configured to embed watermarks. Persons of ordinary skill in the art will appreciate that the example process of FIG. 18 may be implemented as machine accessible or readable instructions utilizing any of many different programming codes stored on any combination of machine-accessible media such as a volatile or nonvolatile memory or other mass storage device (e.g., a floppy disk, a CD, and a DVD). For example, the machine accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium. The example process of FIG. 18 may be implemented using, for example, any desired processor system such as a system similar or identical to the system 600 of FIG. 6. Further, although a particular order of actions is illustrated in FIG. 18, persons of ordinary skill in the art will appreciate that these actions can be performed in other temporal sequences. Again, the flow diagram 1800 is merely provided and described in conjunction with the components of FIGS. 11 to 14 as an example of one way to configure a system to embed watermarks in a compressed digital data stream.

In the example of FIG. 18, the process begins with the identifying unit 1310 (FIG. 13) identifying a frame associated with the compressed digital data stream 1140 (FIG. 11) such as Frame A (FIG. 14) (block 1810). The identified frame may include a plurality of MDCT coefficient sets formed by overlapping and concatenating a plurality of audio blocks. In accordance with the AC-3 compression standard, for example, a frame may include six MDCT coefficient sets (i.e., six "audblk"). Further, the identifying unit 1310 (FIG. 13) also identifies header information associated with the frame (block 1820). For example, the identifying unit 1310 may identify the number of channels associated with the compressed digital data stream 1140. The unpacking unit 1320 then unpacks the plurality of MDCT coefficient sets to determine compression information associated with the original compression process used to generate the compressed digital data stream 1140 (block 1830). In particular, the unpacking unit 1320 identifies the mantissa $M_k$ and the exponent $X_k$ of each MDCT coefficient $m_k$ of each of the MDCT coefficient sets. The exponents of the MDCT coefficients may then be grouped in a manner compliant with the AC-3 compression standard. The unpacking unit 1320 (FIG. 13) determines the number of bits used to represent the mantissas of each of the MDCT coefficients so that a suitable quantization look-up table specified the AC-3 compression standard may be used to modify the plurality of MDCT coefficient sets as described above in connection with FIG. 15.

Figure 19:
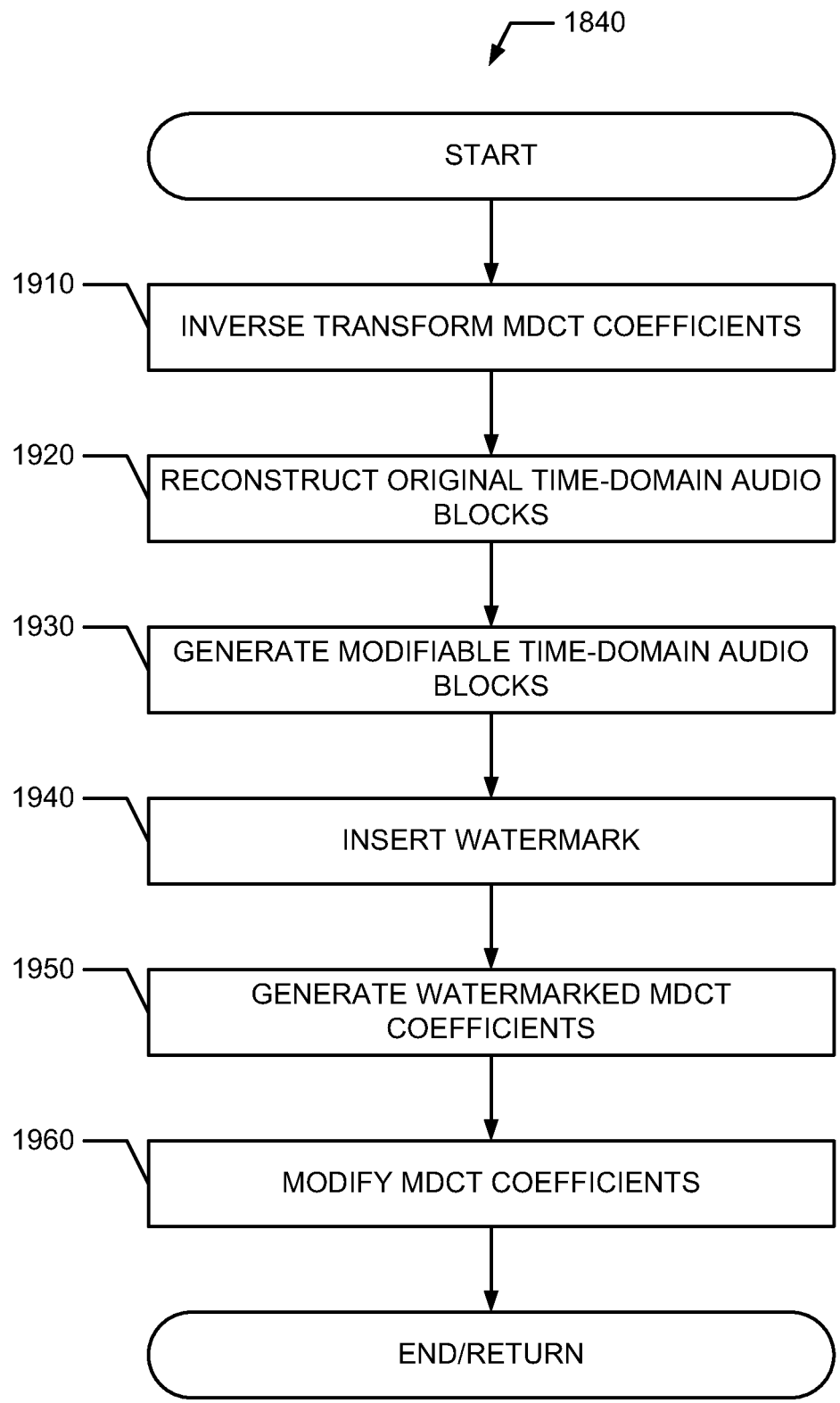
FIG. 19 is a flow diagram depicting one manner in which the modification process of FIG. 18 may be implemented.

As illustrated in FIG. 19, the modification process 1840 begins by using the modifying unit 1330 (FIG. 13) to perform an inverse transform of the MDCT coefficient sets to generate inverse transformed audio blocks (block 1910). In particular, the modification unit 1330 generates an old inverse transformed time-domain audio block (which is represented as a prime block) and a new inverse transformed time-domain audio block (which is represented as a double-prime block) associated with each of the 256-sample compressed time-domain audio blocks of the MDCT coefficient sets. As described in conjunction with FIG. 14, for example, the modification unit 1330 may generate TA4" and TA5' from the MDCT coefficient set MA5, TA5" and TB0' from the MDCT coefficient set MB0, and TB0" and TB1' from the MDCT coefficient set MB1. For each compressed time-domain audio block, the modification unit 1330 adds corresponding prime and double-prime blocks to reconstruct the compressed time-domain audio block based on, for example, the Princen-Bradley TDAC technique (block 1920). Following the above example, the prime block TA5' and the double-prime block TA5" may be added to reconstruct the compressed time-domain audio block TA5 (i.e., the reconstructed time-domain audio block TA5R) while the prime block TB0' and the double-prime block TB0" may be added to reconstruct the compressed time-domain audio block TB0 (i.e., the reconstructed time-domain audio block TB0R).

To insert the watermark 1130, the modification unit 1330 generates modifiable time-domain audio blocks using the reconstructed time-domain audio blocks (block 1930). The modification unit 1330 may generate a 512-sample time-domain audio block using two adjacent reconstructed time-domain audio blocks. For example, the modification unit 1330 may generate a modifiable time-domain audio block by concatenating the reconstructed time-domain audio blocks TA5R and TB0R.

Implementing an encoding process such as, for example, one or more of the encoding methods and apparatus described in U.S. Pat. Nos. 6,272,176, 6,504,870, and/or 6,621,881, the modification unit 1330 inserts the watermark data 1130 into the modifiable time-domain audio blocks (block 1940). For example, the modification unit 1330 may insert the watermark data 1130 into the 512-sample time-domain audio block generated using the reconstructed time-domain audio blocks TA5R and TB0R to generate the watermarked time-domain audio blocks TA5W and TB0W. Based on the watermarked time-domain audio blocks and the compression information, the modification unit 1330 generates watermarked MDCT coefficient sets (block 1950). As noted above, two watermarked time-domain audio blocks, where each block includes 256 samples, may be used to generate a watermarked MDCT coefficient set. For example, the watermarked time-domain audio blocks TA5W and TB0W may be concatenated to generate the watermarked MDCT coefficient set MA5W.

Based on the compression information associated with the compressed digital data stream 1140, the modification unit 1330 calculates the mantissa value associated with each of the watermarked MDCT coefficients in the watermarked MDCT coefficient set MA5W as described above in conjunction with FIG. 15. In this manner, the modification unit 1330 can modify the original MDCT coefficient sets using the watermarked MDCT coefficient sets to embed or insert the watermark data 1130 in the compressed digital data stream 1140 (block 1960). Following the above example, the modification unit 1330 may replace the original MDCT coefficient set MA5 with the watermarked MDCT coefficient set MA5W. In particular, the modification unit 1330 may replace an original MDCT coefficient in the MDCT coefficient set MA5 with a corresponding watermarked MDCT coefficient in the watermarked MDCT coefficient set MA5W. Alternatively, the modification unit 1330 may compute the difference between the mantissa codes associated with the original MDCT coefficient and the corresponding watermarked MDCT coefficient (i.e., $\Delta M_k = M_k - WM_k$) and modify the original MDCT coefficient based on the difference $\Delta M_k$. After modifying the original MDCT coefficient sets, the modification process 1840 terminates and returns control to block 1850.

Referring back to FIG. 18, the repacking unit 1340 repacks the frame of the compressed digital data stream (block 1850). In particular, the repacking unit 1340 identifies the position of the MDCT coefficient sets within the frame so that the watermarked MDCT coefficient sets may replace the MDCT coefficient sets to rebuild the frame. At block 1860, if the embedding device 1130 determines that additional frames of the compressed digital data stream 1140 need to be processed, then control returns to block 1810. Otherwise, if all frames of the compressed digital data stream 1140 have been processed, then the process 1800 may terminate.

As noted above, known watermarking techniques typically decompress a compressed digital data stream into uncompressed time-domain samples, insert the watermark into the time-domain samples, and recompress the watermarked time-domain samples into a watermarked compressed digital data stream. In contrast, the digital data stream 1140 remains compressed during the unpacking, modifying, and repacking processes described herein. Thus, the watermark data 1130 is embedded into the compressed digital data stream 1140 without having to perform additional decompression/compression cycles that may degrade the quality of the audio and/or video content in the compressed digital data stream 1400.

Figure 20:
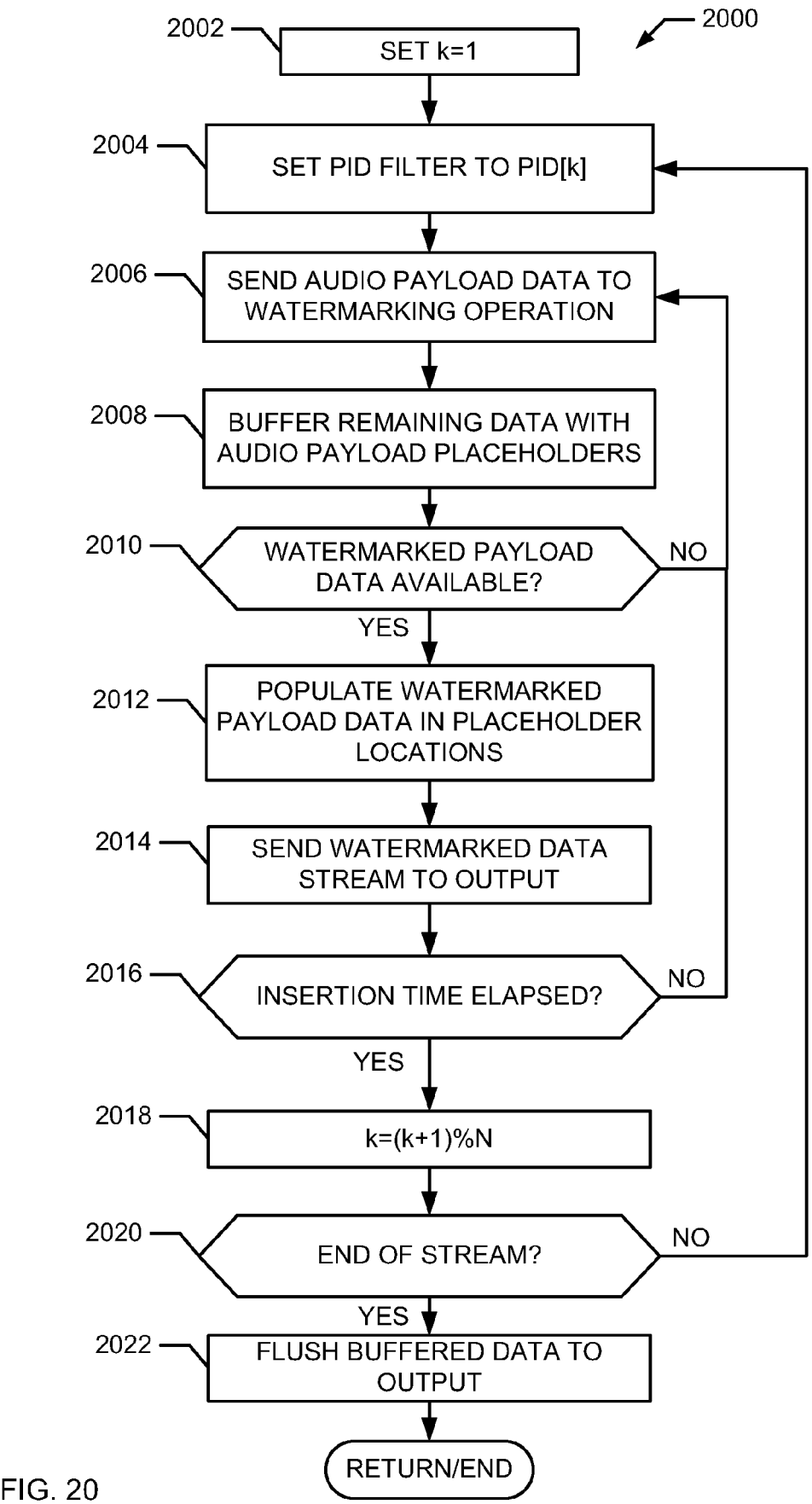
FIG. 20 is a flow diagram depicting another manner in which the example watermarking system of FIG. 11 may be used with the example data inserter of FIG. 3.

FIG. 20 is a flow diagram depicting one manner in which the example data inserter 302 (FIG. 3) may be configured to perform the watermarking operations described in connection with FIGS. 11-19. However, before describing the operations depicted in FIG. 20 in detail, a brief description of the manner in which the example data inserter 302 (FIG. 3) maps minor channel number and source identifier information to data locations within an AC-3 compliant data stream is provided below. In particular, the data inserter 302 (FIG. 3) may be configured to store (or have access to) a static or fixed mapping of source identifiers to minor channel numbers. An example of such a mapping is depicted below in Table 7.

TABLE 7

| SID | Minor Channel Number |
|---|---|
| xx | 1 |
| yy | 2 |
| zz | 3 |
| ... | ... |
| ... | N |

While example mapping depicted in Table 7 above can be used to determine the source identifier associated with a given minor channel number, the identifiers used to identify minor channel information within an AC-3 data stream are dynamically allocated. As a result, another dynamic mapping must be used to enable the extraction of audio information associated with a particular minor channel. To provide such a dynamic mapping, an array PID[k], where k=1 to N for N minor channels, may be used to provide the dynamically allocated AC-3 data stream identifiers corresponding to each of the available minor channels. The array PID[k] may be updated (i.e., kept consistent with current identifier allocation) by parsing allocation information from the PSI and PSIP tables described above. Once the dynamically allocated identifier used to identify audio information associated with a particular minor channel, the source identifier (SID) associated with that minor channel may be determined using, for example, a table such as that shown above as Table 7. It should be recognized that the example static and dynamic mappings described above may be more generally applied to audio and/or video data streams having formats similar to or different from AC-3 compliant data streams.

In the flow diagram in FIG. 20, a watermarking process 2000 embeds or inserts watermark data for a limited amount of time in the data streams associated with a sequence of minor channels. The embedding or insertion of watermark data is typically a computationally and, thus, time intensive process. Thus, to ensure that a finite amount of delay is imparted to a data stream into which watermark data is embedded or inserted, the process 2000 inserts or embeds watermark data in each of a plurality of audio data streams, each of which may be associated with a particular minor channel, for a limited amount of time. In this manner the amount of delay imparted to each of the data streams can to be limited (i.e., made finite) so that any real time decoding and/or rendering process associated with the data stream is not affected in a perceptible manner.

Now turning in detail to the example process 2000 depicted in FIG. 20, a minor channel index k is initialized to one (block 2002). Next, the program identifier (PID) associated with a first minor channel number is set equal to the value stored in the dynamic minor channel mapping array at the index k (i.e., PID[k] as described above) to filter or extract data associated with the first minor channel number from an audio (e.g., AC-3 compliant) data stream (block 2004). The data packets containing audio content (i.e., payload packets to be transmitted) are then parsed from the minor channel data filtered at block 2004 and sent to a watermarking operation (block 2006). The watermarking operation may be similar or identical to that described above in connection with FIGS. 11-19. The remaining non-payload data (e.g., header and other encapsulating information) is then buffered with placeholders for the removed audio payload data (block 2008).

The process 2000 then determines if the payload data sent to the watermarking operation at block 2006 has been watermarked and is now available for transport (block 2010). If the watermarked data is not yet available, the process returns control to block 2006. On the other hand, if the watermarked data is available, the process embeds, inserts or populates the corresponding buffered non-payload data in the appropriate corresponding placeholder locations (block 2012). Once the watermarked data has been inserted in the data stream of the minor channel currently being watermarked, the watermarked data stream is then sent to be output (i.e., transmitted) (block 2014). The process then checks if the amount of time for which the process 2000 has inserted watermarked data exceeds a predetermined time limit (block 2016). For example, the process may insert watermark information into the data streams associated with each minor channel for a predetermined amount of time (e.g., five seconds). The amount of elapsed insertion time may be determined using, for example, the number of bits transmitted divided by the transmission bit rate. Alternatively, a timer function within a processor system or the like may be used to measure a predetermined amount of time. If the predetermined amount of insertion time has not elapsed at block 2016, the process returns control to block 2006. On the other hand, if the predetermined amount of time has elapsed at block 2016, then the index k is incremented using a modulo-based counter (block 2018). In particular, the index k is incremented at block 2018 to vary from one to N.

The process then checks if the end of the transport stream has been detected (block 2020). If the end of the transport stream has not been detected at block 2020, then the process returns control to block 2004. On the other hand, if the end of the transport stream is detected at block 2020, then any remaining buffered data is flushed to be output (i.e., transmitted) (block 2022). While the example process 2000 depicted in FIG. 20 is configured to watermark each of a sequence of minor channels for a finite time period (e.g., a periodic round robin technique for a plurality of minor channels), other architectures and/or techniques could be used instead. For example, in the event that additional delay is acceptable, watermark data may be inserted or embedded into a plurality of minor channel data streams simultaneously (i.e., rather than one at a time in sequence as described in connection with FIG. 20).

The methods and apparatus disclosed herein are particularly well suited for use with data streams implemented in accordance with the AC-3 standard. However, persons of ordinary skill in the art will appreciate that the teachings of the disclosure may be applied to other digital audio and/or video encoding techniques, standards, etc.

In addition, while this disclosure is made with respect to example television systems, it should be understood that the disclosed system is readily applicable to many other media systems. Accordingly, while this disclosure describes example systems and processes, persons of ordinary skill in the art will readily appreciate that the disclosed examples are not the only way to implement such systems.

Although certain methods, apparatus and articles of manufacture have been described herein, the scope of coverage of this patent is not limited thereto. To the contrary, this patent covers all embodiments including apparatus, methods and articles of manufacture fairly falling within the scope of the claims, either literally or under the doctrine of equivalents.

What is claimed is:

1. A method to insert audience measurement data in a compressed media data stream, the method comprising:

rearranging data in frames of the compressed media data stream to form contiguous sequences of skip bytes at respective locations in the frames of the compressed media data stream, the audience measurement data to be inserted in the compressed media data stream at the locations of the contiguous sequences of skip bytes, the contiguous sequences of skip bytes having respective lengths; and inserting different types of audience measurement data at the locations of the contiguous sequences of skip bytes in two different frames of the compressed media data stream based on the respective lengths of the contiguous sequences of skip bytes in the two different frames of the compressed media data stream, wherein inserting the different types of audience measurement data comprises:

formatting the audience measurement data into payload segments corresponding to the different types of audience measurement data;

inserting a first sequence of the payload segments in a first frame of the compressed media data stream based on a length of a first contiguous sequence of skip bytes in the first frame; and inserting a second sequence of the payload segments in a second frame of the compressed media data stream based on a length of a second contiguous sequence of skip bytes in the second frame, the length of the second contiguous sequence of skip bytes being different from the length of the first contiguous sequence of skip bytes.

2. A method as defined in claim 1, wherein the first sequence of the payload segments includes all of the payload segments, and the second sequence of the payload segments includes a subset of the payload segments.

3. A method as defined in claim 1, wherein the second sequence of the payload segments has a different order and a different number of payload segments than the first sequence of the payload segments.

4. A method as defined in claim 1, further comprising extracting program and system information protocol data multiplexed with the compressed media data stream to determine the audience measurement data.

5. A method as defined in claim 1, further comprising modifying program and system information protocol data multiplexed with the compressed media data stream based on the audience measurement data inserted in the compressed media data stream.

6. A method to insert audience measurement data in a compressed media data stream, the method comprising:

rearranging data in frames of the compressed media data stream to form contiguous sequences of skip bytes at respective locations in the frames of the compressed media data stream, the audience measurement data to be inserted in the compressed media data stream at the locations of the contiguous sequences of skip bytes, the contiguous sequences of skip bytes having respective lengths;

inserting different types of audience measurement data at the locations of the contiguous sequences of skip bytes in two different frames of the compressed media data stream based on the respective lengths of the contiguous sequences of skip bytes in the two different frames of the compressed media data stream;

formatting the audience measurement data into a plurality of payload segments containing the different types of audience measurement data, the plurality of payload segments including a transport identifier segment, a major channel segment, a minor channel segment and a time segment, the audience measurement data further including a first index to represent an ordering of the payload segments and a second index to represent a number of payload segments to be included in a particular frame of the compressed media data stream;

varying the ordering of the payload segments inserted at the locations of the contiguous sequences of skip bytes in the two different frames of the compressed media data stream; and varying the number of the payload segments inserted at the locations of the contiguous sequences of skip bytes in the two different frames of the compressed media data stream based on the respective lengths of the contiguous sequences of skip bytes in the two different frames of the compressed media data stream.

7. A tangible machine readable storage device/disc comprising machine readable instructions which, when executed, cause a machine to at least: rearrange data in frames of a compressed media data stream to form contiguous sequences of skip bytes at respective locations in the frames of the compressed media data stream, wherein audience measurement data is to be inserted in the compressed media data stream at the locations of the contiguous sequences of skip bytes, the contiguous sequences of skip bytes having respective lengths;

insert different types of audience measurement data at the locations of the contiguous sequences of skip bytes in two different frames of the compressed media data stream based on the respective lengths of the contiguous sequences of skip bytes in the two different frames of the compressed media data stream;

format the audience measurement data into payload segments corresponding to the different types of audience measurement data;

insert a first sequence of the payload segments in a first frame of the compressed media data stream based on a length of a first contiguous sequence of skip bytes in the first frame; and insert a second sequence of the payload segments in a second frame of the compressed media data stream based on a length of a second contiguous sequence of skip bytes in the second frame, the length of the second contiguous sequence of skip bytes being different from the length of the first contiguous sequence of skip bytes.

8. A tangible storage device/disc as defined in claim 7, wherein the first sequence of the payload segments includes all of the payload segments, and the second sequence of the payload segments includes a subset of the payload segments.

9. A tangible storage device/disc as defined in claim 7, wherein the second sequence of the payload segments has a different order and a different number of payload segments than the first sequence of the payload segments.

10. A tangible storage device/disc as defined in claim 7, wherein the machine readable instructions, when executed, further cause the machine to extract program and system information protocol data multiplexed with the compressed media data stream to determine the audience measurement data.

11. A tangible storage device/disc as defined in claim 7, wherein the machine readable instructions, when executed, further cause the machine to modify program and system information protocol data multiplexed with the compressed media data stream based on the audience measurement data inserted in the compressed media data stream.

12. A tangible machine readable storage device/disc comprising machine readable instructions which, when executed, cause a machine to at least:

rearrange data in frames of a compressed media data stream to form contiguous sequences of skip bytes at respective locations in the frames of the compressed media data stream, wherein audience measurement data is to be inserted in the compressed media data stream at the locations of the contiguous sequences of skip bytes, the contiguous sequences of skip bytes having respective lengths;

insert different types of audience measurement data at the locations of the contiguous sequences of skip bytes in two different frames of the compressed media data stream based on the respective lengths of the contiguous sequences of skip bytes in the two different frames of the compressed media data stream;

format the audience measurement data into a plurality of payload segments containing the different types of audience measurement data, the plurality of payload segments including a transport identifier segment, a major channel segment, a minor channel segment and a time segment, the audience measurement data further including a first index to represent an ordering of the payload segments and a second index to represent a number of payload segments to be included in a particular frame of the compressed media data stream;

vary the ordering of the payload segments inserted at the locations of the contiguous sequences of skip bytes in the two different frames of the compressed media data stream; and vary the number of the payload segments inserted at the locations of the contiguous sequences of skip bytes in the two different frames of the compressed media data stream based on the respective lengths of the contiguous sequences of skip bytes in the two different frames of the compressed media data stream.

13. An apparatus to insert audience measurement data in a compressed media data stream, the apparatus comprising:

a data generator to format the audience measurement data into payload segments corresponding to different types of audience measurement data; and a data insertion unit to:

rearrange data in frames of a compressed media data stream to form contiguous sequences of skip bytes at respective locations in the frames of the compressed media data stream, the audience measurement data to be inserted in the compressed media data stream at the locations of the contiguous sequences of skip bytes, the contiguous sequences of skip bytes having respective lengths; and insert different payload segments of audience measurement data at the locations of the contiguous sequences of skip bytes in two different frames of the compressed media data stream based on the respective lengths of the contiguous sequences of skip bytes in the two different frames of the compressed media data stream.

14. An apparatus as defined in claim 13, wherein the data insertion unit is to:

insert a first sequence of the payload segments in a first frame of the compressed media data stream based on a length of a first contiguous sequence of skip bytes in the first frame; and insert a second sequence of the payload segments in a second frame of the compressed media data stream based on a length of a second contiguous sequence of skip bytes in the second frame, the length of the second contiguous sequence of skip bytes being different from the length of the first contiguous sequence of skip bytes.

15. An apparatus as defined in claim 14, wherein the first sequence of the payload segments includes all of the payload segments, and the second sequence of the payload segments includes a subset of the payload segments.

16. An apparatus as defined in claim 14, wherein the second sequence of the payload segments has a different order and a different number of payload segments than the first sequence of the payload segments.

17. An apparatus as defined in claim 13, wherein the payload segments include a transport identifier segment, a major channel segment, a minor channel segment and a time segment, the audience measurement data further includes a first index to represent an ordering of the payload segments and a second index to represent a number of payload segments to be included in a particular frame of the compressed media data stream, and the data insertion unit is to:

vary the ordering of the payload segments inserted at the locations of the contiguous sequences of skip bytes in the two different frames of the compressed media data stream; and vary the number of the payload segments inserted at the locations of the contiguous sequences of skip bytes in the two different frames of the compressed media data stream based on the respective lengths of the contiguous sequences of skip bytes in the two different frames of the compressed media data stream.

18. An apparatus as defined in claim 13, further comprising a program information modifier to modify program and system information protocol data multiplexed with the compressed media data stream based on the audience measurement data inserted in the compressed media data stream.

* * * * *